(12) United States Patent (10) Patent No.: US 12,637,305 B2
Bretz (45) Date of Patent: May 26, 2026

(54) DEVICE, METHOD AND SYSTEM FOR COMMISSIONING GOODS

(71) Applicant: FERAG AG, Hinwil (CH)

(72) Inventor: Markus Bretz, Herrliberg (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 18/119,002

(22) Filed: Mar. 8, 2023

(65) Prior Publication Data

US 2023/0219770 A1 Jul. 13, 2023

Related U.S. Application Data

(63) Continuation-in-part of application No. 17/689,548, filed on Mar. 8, 2022, now Pat. No. 11,878,876, which is a continuation-in-part of application No. 16/481,212, filed as application No. PCT/IB2018/050446 on Jan. 25, 2018, now Pat. No. 11,267,658.

(30) Foreign Application Priority Data

| Jan. 31, 2017 | (CH) | ..................................... | 00109/17 |
| Jul. 8, 2022 | (CH) | ..................................... | 00821/22 |

(51) Int. Cl.
| *B65G 47/30* | (2006.01) |
| *B65G 47/40* | (2006.01) |
| *B65G 47/44* | (2006.01) |
| *B65G 47/61* | (2006.01) |

(52) U.S. Cl.
CPC .............. *B65G 47/61* (2013.01); *B65G 47/40* (2013.01); *B65G 47/44* (2013.01)

(58) Field of Classification Search
CPC ........ B65G 47/30; B65G 47/40; B65G 47/44; B65G 47/61
USPC .......................................... 198/575; 700/230
See application file for complete search history.

(56) References Cited

U.S. PATENT DOCUMENTS

| 2,609,082 | A | 9/1952 | Leach |
| 2,643,761 | A | 6/1953 | Wagner et al. |
| 2,992,721 | A | 7/1961 | Eger |
| 4,144,538 | A | 3/1979 | Chapman et al. |
| 4,318,807 | A | 3/1982 | Maki-Hoimela et al. |
| 4,508,484 | A | 4/1985 | Heiz |
| 4,805,780 | A | 2/1989 | Sølund |
| 5,125,500 | A | 6/1992 | Cailbault |

(Continued)

FOREIGN PATENT DOCUMENTS

| AT | 520412 A1 | 3/2019 |
| DE | 1 175 153 B | 7/1964 |

(Continued)

*Primary Examiner* — Douglas A Hess
(74) *Attorney, Agent, or Firm* — Pauley Erickson & Swanson

(57) ABSTRACT

A device for commissioning goods (2) with a goods feed (3), the device including an unloading device (10) with at least one unloading point (11) for unloading goods (2), and an unloading handling module (20), to which the goods (2) are transferred from the unloading device (10), the unloading handling module (20) including at least one goods receiving element (21, 31, 81) and a moving element (22, 32) for transferring the goods (2) to a downstream conveying unit (30).

27 Claims, 13 Drawing Sheets

(56) References Cited

U.S. PATENT DOCUMENTS

| | | | |
|---|---|---|---|
| 5,209,326 A * | 5/1993 | Harper | F16F 7/1005 |
| | | | 267/136 |
| 5,799,769 A | 9/1998 | Heer et al. | |
| 6,464,067 B1 | 10/2002 | Reist | |
| 6,516,242 B1 * | 2/2003 | Brown | G06Q 10/04 |
| | | | 700/95 |
| 6,840,367 B2 * | 1/2005 | Tucker | B23P 19/001 |
| | | | 29/33 P |
| 6,840,369 B2 * | 1/2005 | Derenthal | B65G 47/647 |
| | | | 198/418.6 |
| 7,080,727 B1 | 7/2006 | Sanderson | |
| 7,387,195 B2 * | 6/2008 | Bonham | G05B 19/41845 |
| | | | 198/370.01 |
| 7,584,017 B2 * | 9/2009 | Sugano | B65G 1/0485 |
| | | | 700/228 |
| 7,870,945 B2 * | 1/2011 | Mileaf | B07C 3/08 |
| | | | 198/572 |
| 8,151,973 B2 | 4/2012 | Borkiewicz et al. | |
| 8,240,461 B2 * | 8/2012 | Asano | B65G 47/5195 |
| | | | 209/592 |
| 8,505,712 B2 | 8/2013 | Andreae et al. | |
| 8,546,704 B1 * | 10/2013 | Minardi | B29C 49/4205 |
| | | | 177/25.18 |
| 8,607,963 B2 | 12/2013 | Wend et al. | |
| 9,499,949 B2 * | 11/2016 | Kline | E01C 19/2005 |
| 9,630,751 B1 | 4/2017 | Otto | |
| 9,815,635 B2 | 11/2017 | Sieksmeier et al. | |
| 10,005,616 B2 | 6/2018 | Fenile et al. | |
| 10,048,697 B1 * | 8/2018 | Theobald | B65G 47/61 |
| 10,065,800 B2 | 9/2018 | Auf Der Maur | |
| 10,112,783 B2 | 10/2018 | Stauber | |
| 10,301,121 B1 | 5/2019 | Hoffman et al. | |
| 10,322,887 B2 | 6/2019 | Fenile | |
| 10,358,299 B2 * | 7/2019 | Ruge | B65B 5/045 |
| 10,437,255 B1 * | 10/2019 | Theobald | G05D 1/0088 |
| 10,633,195 B2 | 4/2020 | Gadliger | |
| 10,647,523 B2 | 5/2020 | Sigrist | |
| 10,875,716 B2 | 12/2020 | Schönenberger | |
| 10,954,079 B2 | 3/2021 | Ramseier | |
| 11,137,772 B2 | 10/2021 | Theobald | |
| 11,267,658 B2 * | 3/2022 | Fenile | B65D 29/00 |
| 11,299,350 B2 | 4/2022 | Fenile et al. | |
| 11,352,216 B2 | 6/2022 | Reischl et al. | |
| 11,465,847 B2 * | 10/2022 | Sutter | B65G 1/1378 |
| 11,465,857 B2 | 10/2022 | Krauss et al. | |
| 11,560,249 B2 * | 1/2023 | Schaafsma | B65G 47/91 |
| 11,649,117 B2 * | 5/2023 | Durtschi | B65G 47/38 |
| | | | 198/340 |
| 11,878,876 B2 * | 1/2024 | Fenile | B65G 47/40 |
| 2003/0106774 A1 | 6/2003 | Muller | |
| 2009/0026041 A1 | 1/2009 | Schaefer | |
| 2010/0089722 A1 | 4/2010 | Wiedemann et al. | |
| 2012/0037272 A1 | 2/2012 | Wend et al. | |
| 2014/0086713 A1 | 3/2014 | Fankhauser et al. | |
| 2014/0303770 A1 | 10/2014 | Wend et al. | |
| 2015/0225177 A1 | 8/2015 | Schöneberger | |
| 2017/0088302 A1 | 3/2017 | Auf Der Maur | |
| 2017/0275826 A1 | 9/2017 | Fenile et al. | |
| 2017/0282317 A1 | 10/2017 | Guhl | |
| 2017/0341864 A1 | 11/2017 | Stauber | |
| 2017/0369248 A1 | 12/2017 | Fenile | |
| 2017/0369250 A1 | 12/2017 | Fenile et al. | |
| 2018/0072511 A1 | 3/2018 | Fenile | |
| 2018/0208407 A1 | 7/2018 | Ruge et al. | |
| 2018/0215547 A1 | 8/2018 | Fenile et al. | |
| 2018/0244471 A1 | 8/2018 | Keller et al. | |
| 2018/0244473 A1 | 8/2018 | Mathi et al. | |
| 2018/0244488 A1 | 8/2018 | Keller et al. | |
| 2018/0251303 A1 | 9/2018 | Mathi et al. | |
| 2018/0312341 A1 | 11/2018 | Keller et al. | |
| 2018/0354728 A1 | 12/2018 | Sigrist | |
| 2019/0270197 A1 | 9/2019 | Wagner et al. | |
| 2019/0367282 A1 | 12/2019 | Stauber | |
| 2019/0377335 A1 | 12/2019 | Voelker | |
| 2020/0024074 A1 | 1/2020 | Herzog-Lang et al. | |
| 2020/0071077 A1 | 3/2020 | Winkler | |
| 2020/0189846 A1 | 6/2020 | Sutter | |
| 2021/0002079 A1 | 1/2021 | Mäder | |
| 2021/0053763 A1 | 2/2021 | Fenile et al. | |
| 2021/0126133 A1 | 4/2021 | Fang et al. | |
| 2021/0171292 A1 | 6/2021 | Fenile et al. | |
| 2021/0300679 A1 | 9/2021 | Meurer | |
| 2021/0395022 A1 | 12/2021 | Ramseier et al. | |
| 2022/0332520 A1 | 10/2022 | Fenile et al. | |

FOREIGN PATENT DOCUMENTS

| | | |
|---|---|---|
| DE | 195 04 879 A1 | 8/1996 |
| DE | 10 2014 203 298 A1 | 6/2005 |
| DE | 103 54 419 A1 | 6/2005 |
| DE | 10 2004 018 569 A1 | 11/2005 |
| DE | 10 2008 026 720 A1 | 12/2009 |
| DE | 10 2009 017 343 A1 | 10/2010 |
| DE | 20 2012 012331 U1 | 1/2013 |
| DE | 10 2011 116 081 B3 | 4/2013 |
| DE | 10 2012 101 198 A1 | 4/2013 |
| DE | 10 2012 018925 A1 | 3/2014 |
| DE | 10 2013 104 423 A1 | 10/2014 |
| DE | 20 2017 105 508 U1 | 12/2017 |
| EP | 0 050 245 A1 | 4/1982 |
| EP | 1419981 A1 | 5/2004 |
| EP | 2 130 968 A1 | 12/2009 |
| EP | 2 196 415 A2 | 6/2010 |
| EP | 3 354 605 A1 | 8/2018 |
| EP | 3 575 246 A1 | 12/2019 |
| EP | 3 581 524 A1 | 12/2019 |
| EP | 2 709 933 B1 | 4/2020 |
| EP | 4 011 807 A1 | 6/2020 |
| EP | 4 122 849 A1 | 1/2023 |
| GB | 2 232 391 A | 12/1990 |
| JP | S46 11228 Y1 | 4/1971 |
| JP | S52-37381 U | 3/1977 |
| JP | S52-41873 U | 3/1977 |
| JP | S60-176868 U | 11/1985 |
| JP | H04 339744 A | 11/1992 |
| JP | H09-58860 A | 3/1997 |
| JP | 2000-289815 A | 10/2000 |
| SU | 1 169 904 A1 | 7/1985 |
| WO | WO 90/03853 A2 | 4/1990 |
| WO | WO 95/21116 A | 8/1995 |
| WO | WO 2013/053747 A1 | 4/2013 |
| WO | WO 2014/009138 A1 | 1/2014 |
| WO | WO 2015/124524 A1 | 8/2015 |
| WO | WO 2016/030275 A1 | 3/2016 |
| WO | WO 2017/202491 A1 | 11/2017 |
| WO | WO 2018/078098 A1 | 5/2018 |
| WO | WO 2018/082749 A1 | 5/2018 |
| WO | WO 2018/142243 A1 | 8/2018 |
| WO | WO 2020/011628 A1 | 1/2020 |
| WO | WO 2023/095049 A1 | 6/2023 |

* cited by examiner

DEVICE, METHOD AND SYSTEM FOR COMMISSIONING GOODS

CROSS REFERENCE TO RELATED APPLICATIONS

Swiss Patent Application 00821/22, filed 8 Jul. 2022, the priority document corresponding to this invention, to which a foreign priority benefit is claimed under Title 35, United States Code, Section 119, and Title 37, United States Code, Section 1.55, and its entire teachings are incorporated, by reference, into this specification.

This application is also a continuation-in-part patent application of U.S. Patent Application Ser. No. 17/689,548, filed 8 Jul. 2022; which is a continuation-in-part of U.S. patent application Ser. No. 16/481,212, filed on 26 Jul. 2019, now U.S. Pat. No. 11,267,658, issued on 8 Mar. 2022, which is a 371 National Phase Application filing of International Patent Application No. PCT/IB2018/050446, filed 25 Jan. 2018, which claims the priority to Swiss Patent Application No. CH 00109/17, filed 31 Jan. 2017.

All the above-referenced applications are hereby incorporated by reference herein in their entirety and are made a part hereof, including but not limited to those portions which specifically appear hereinafter.

BACKGROUND OF THE INVENTION

Field of the Invention

The invention relates to the field of transport and conveying technology, in particular the commissioning of goods. It relates to a device, a method, and a system for commissioning piece goods according to the preamble of the independent patent claims.

Discussion of Related Art

The commissioning of piece goods, the latter also referred to as goods in the following, for customer orders, production orders or other preparatory piece goods assemblies plays a central role in transport and conveying technology. Goods, i.e., typically intended for commissioning orders for end users or customers, can be commissioned particularly advantageously within the scope of the invention, even in complex logistics systems. Goods are a special case of piece goods, whereby in the following description goods always also mean other piece goods, such as parts for automobile production or machine assembly, parts for assembly systems, etc.

In conveyor technology, a distinction is often made between two types of commissioning systems, namely the "person-to-goods system" and the "goods-to-person system". The latter is dynamic and largely automated, both characteristics that are desirable in conveyor technology. However, "goods-to-person systems" are associated with higher costs, more complex logistics system design, and an increased risk of faulty transfer timing due to conveyor malfunctions, mismanagement, capacity overload, or even a stoppage of the flow of goods in the event of component malfunctions or machine failure.

In this context, commissioning in a dynamic "goods-to-person system" does not only mean the assembly of goods based on the requirements of the actual goods conveyance, but also the order-oriented provision, intermediate storage/buffering, sorting, removal, and transport of the goods to be commissioned. In addition to conveyor systems, belts and conveyors, commissioning systems should have buffering capabilities that enable dynamic operation of the commissioning system depending on various parameters, such as priorities of individual orders, demand, energy consumption or other requirements, thereby reducing or avoiding the risk of delay or even standstill of plant sections or the entire plant WO 2018/142243 A1 discloses a device for emptying transport bags conveyed in a sus-pended manner, comprising a conveying system, in particular a rail-guided conveying system or a conveyor chain system, with which transport bags can be supplied in a suspended manner along a conveying path, the transport bags having a bag which is open at the top when in the full state and has a front, and a circulating conveyor belt for transferring items of piece goods transported in the transport bags. In a contact section, the conveying path of the conveying system and the conveying path of the conveyor belt are arranged relative to each other in such a manner that the distance between the conveying path of the conveying system and the conveying path of the conveyor belt becomes continuously smaller, so that, when a transport bag is conveyed along the contact section, the front of the bag of the transport bag makes contact with and comes to lie on the conveyor belt, and the transport bag is pivoted backwards in the process. A conveyor system according to WO 2018/142243 enables an automatic and continuous emptying of transport bags and a subsequent conveying away of goods transported in transport bags. The device does not show a particularly optimized buffering and sorting possibility of the goods after the emptying of the transport bags.

Conveyor systems with commissioning systems are known, for example, from EP 3 581 524 A1. This publication discloses a method and a device for creating orders from individual goods, comprising conveying at least one individual good by means of a respective carrying device to an unloading station. At the unloading station, an order-oriented unloading of the at least one individual product from the carrying device takes place, whereupon the at least one individual product of an order is transported from a transport infrastructure to a packing station. There, the transport infrastructure to which the order goods are transferred is namely an autonomous vehicle. A major disadvantage of such a commissioning system is that the transport infrastructure has to be adapted to the respective unloading station as well as to the packing station and individual goods of an order remain at the unloading station until further transport to the packing station by the transport infrastructure. This leads to undesirable waiting times directly at the unloading station and, among other things, to a risk of serious congestion or even a standstill at the unloading and/or packing station due to the non-existent buffer capacity of the unloading station. If the transport infrastructure does not have enough autonomous vehicles available for transporting the goods away or if transport disruptions occur, the problem arises that individual unloading stations or entire plant sections have to be stopped until unloading is possible again.

From DE 10 2013 104 423 A1 is known a conveyor system and method for conveying unit loads with or without load carriers between an upper transfer station and a lower transfer station. The conveyor system comprises a vertical conveyor, wherein the vertical conveyor has a frame, at least one rotor, which is mounted in the frame so as to be rotatable about an axis of rotation and can be moved by a drive from a pick-up position into a delivery position, and at least one tine receptacle. Each of the tine receptacles is mounted in the rotor for rotation about at least one respective receptacle axis such that, during rotation of the rotor about the axis of rotation, each of the tine receptacles moves along a substantially circular path about the axis of rotation that intersects the upper transfer station and the lower transfer station. The vertical conveyor from DE 10 2013 104 423 A1 is only suitable for certain conveyor systems and is therefore of limited or no use in many existing conveyor systems. Furthermore, the problem of buffering piece goods between the upper and lower transfer stations is not solved, so that delays, susceptibility to malfunctions and consequently cost increases can occur. A horizontal conveyor is also not provided, which further limits the picking of piece goods within the conveyor system.

The present invention strives for a conceptually improved solution approach in which the disadvantages of the prior art are counteracted, and which allows an optimized trouble-free operation of complex commissioning systems. In addition to the specific above-mentioned disadvantages of the prior art, an increase in performance is provided and the forwarding preparation of the commissioning system is also optimized in this field.

SUMMARY OF THE INVENTION

According to the present invention, at least some of the disadvantages of the prior art are eliminated and a commissioning system is created which allows a high degree of automation with optimized design of the unloading of goods from several or a plurality of unloading stations. Advantageous embodiments are provided in the description and result in particular from the patent claims.

The solution according to the invention can be further improved by various embodiments, each of which is advantageous in itself and, unless otherwise specified, can be combined with one another in various ways. These embodiments and the advantages associated therewith will be discussed below.

A relevant aspect of the invention relates to a device for commissioning goods, with a goods supply to an unloading device, comprising an unloading device with at least one unloading point for unloading goods, and an unloading handling module to which the goods are transferred from the unloading device, wherein the unloading handling module comprises at least one goods receiving element and at least one moving element for transferring the goods to a downstream conveying unit.

In a simple embodiment, the unloading device according to the invention comprises an unloading point of the goods, wherein the unloading point is directly or partially connected to the existing logistics, i.e. the goods supply. In one possible embodiment, the goods supply to the unloading device may be designed as a comprehensive conveying system, for example a conveying system according to WO 2018/142243 A1 of the present applicant.

The goods supply to the unloading device can also comprise several independent, interacting conveying systems, so that a high degree of versatility in application can be achieved in intralogistics.

Furthermore, the goods supply can have a loading management of transport units of a conveying system, as shown in the Swiss patent application CH070614/2021 (application date of Nov. 29, 2021), also of the present applicant. Both documents are considered here with regard to their description as fully referenced and included in the present application in terms of content. Such a conveying system preferably comprises a conveying system and a circulating conveyor belt, the conveying system being connected to the unloading device and the latter being connected to at least one unloading handling module in terms of conveying technology. The unloading device advantageously comprises at least one fill unit, which serves to unload the goods from the unloading point of the unloading device or directly from the goods supply and to transfer the goods to the unloading handling module.

A buffer unit can be integrated into the fill unit or assigned to it as a separate module. This has the advantage that no undesirable conveying jams occur when goods are delivered to the unloading device at high feed rates. The fill unit can have one or more integrated buffer points so that the goods can be transferred to the unloading device without disruption even at high feed rates.

For particularly high processing capacities or special logistical requirements, a more powerful buffer unit can also be assigned to the fill unit as a separate module. In this way, such a buffer unit can increase performance (in particular by means of at least four or more buffer points) and, in particularly preferred solutions, also enable the goods fed to be re-sorted. In this way, the buffer unit serves to buffer the goods before the transfer of the goods to the unloading handling module from the unloading device.

The buffer unit is thus designed as an integrated or separate unit connected to the unloading device in terms of conveying technology. The conveying system can be preceded by warehouses, sorters, processing and system monitoring systems, etc. known to those skilled in the art. The conveying system guides goods along a conveyor path to a transfer section of the conveying system and the conveyor belt, where the goods are transferred to the conveyor belt. From the conveyor belt, the goods reach the unloading point of the unloading device, wherein in possible embodiments the unloading point comprises a feeding unit. In preferred embodiments, the feeding unit is designed as a feeding chute along which the goods slide, driven by gravity, in the direction of the unloading device.

In further alternative embodiments, the unloading point comprises a transport bag conveyed along a conveying system, from which the goods are unloaded directly to the unloading device, whereby a buffer device is preferably arranged in this area in the event that the unloading device requires short-term waiting times during the feed. For this purpose, a stopper, for example with a pneumatic cylinder or by means of air braking, can be used to stop the conveyed transport bags in an unloading position and to release them again after the goods have been unloaded. Alternatively, a buffer section or buffer circulation can also preferably be arranged upstream of the infeed point.

According to a further embodiment, it is possible for the unloading point to comprise several differently designed feeding units or passive or active transfer devices. For example, goods can be unloaded to goods receiving elements of the unloading device by means of a first feeding unit, and goods can be added to the goods receiving elements by means of a second feeding unit. Preferably, the first feeding unit can be designed in particular as an overhead conveyor (e.g., a pocket conveyor) and the second feeding unit as a conveyor with flat goods. These optionally deliver the conveyed goods directly or indirectly to the unloading point. In an advantageous embodiment, the first and second feeding units enable goods to be transferred to corresponding goods receiving elements independently of one another. This type of design for feeding goods to the unloading device is particularly advantageous in the case of dynamically changing commissioning requirements, as goods can be allocated to the goods receiving elements at different times and from different conveying systems in accordance with the commissioning requirements. Furthermore, this is particularly advantageous when goods from different storage points of an intralogistics system with independent conveying systems must be added to an order. In addition to the aforementioned feeding solutions, the feeding units can also be implemented as further feeding solutions known to the skilled person.

The fill unit of an unloading device according to the invention can be arranged between the unloading point of the unloading device and/or directly at the unloading handling module. This enables intermediate buffering and/or order-oriented transfer of the goods to the unloading handling module.

The unloading handling module is connected downstream of the unloading device and interacts with it. The unloading handling module can perform additional functions or individual operations that go beyond the unloading of goods. This can include, for example, the pre-packing of small parts of goods into packing units, the sub-grouping of individual goods, the printing of goods or goods groupings of an order, a sensory goods check or, particularly preferably, buffering downstream of the unloading point. Other processing steps known to the person skilled in the art can be realized in alternative embodiments, insofar as these are not explicitly excluded.

The fill unit has at least one goods receiving element which can receive goods individually or collectively according to order. Furthermore, the fill unit can serve to provide unfilled goods receiving elements, which are subsequently filled with goods from the unloading point of the unloading device or directly from the goods supply. In preferred embodiments, the fill unit is designed as a conveyor, in particular a conveyor belt, tray conveyor, roller conveyor, trough conveyor, cross belt conveyor or horizontal sorting array, which can convey unfilled and/or filled goods receiving elements to the unloading handling module.

In possible embodiments, a goods receiving element can be realized as a transport box, container, transport bag, tray, shelf or as a support surface. The goods receiving elements are not limited to the embodiments listed here. In addition to the examples disclosed here, various other solutions are apparent to the person skilled in the art from the description and the accompanying figures. Preferably, however, the invention uses a metallic or metallically coated support surface which has suitable static/sliding friction and an upwardly pointing outer edge so that the goods fed do not slip away from the support surface unintentionally.

The invention provides that at least one moving element is designed as a passive moving element, i.e. without an associated active drive (thus in particular without a motorized movement). Furthermore, it is preferably provided that at least one moving element is designed as an active movement element (with motor drive or another actuator).

Insofar as the transfer of the goods is to be effected according to the invention by tilting the supporting surface, the sliding friction is selected in such a way that the goods to be processed, after adjustable tilting of the surface, can slide off the supporting surface by sheer force of gravity (passive moving element).

An alternative also preferred variant consists of assigning an active moving element to the support table, e.g., a pusher or conveyor rollers, each of which is driven. In further possible embodiments, an active motion element can include a pusher, a tilting surface, a robot arm, a chute, a conveyor plate, a conveyor, in particular a belt conveyor, tray conveyor, roller conveyor, trough conveyor, cross belt conveyor or horizontal sorting array. The correct transfer of the goods by the moving element is preferably monitored by a sensor system that serves to ensure the safe transfer of the goods. This can be done in particular by an optical sensor or an ultrasonic sensor.

An unloading handling module according to the invention comprises at least one goods receiving element and a moving element for transferring the goods to a downstream conveying unit. In a particularly preferred embodiment, the goods receiving element is an open transport box, which is taken over by the fill unit of the goods supply through the unloading handling module and is passed on to the conveying unit.

A return of the transport box from the conveying unit to the unloading handling module and the fill unit of the goods supply is also possible. Such a return transport is provided for empty transport boxes after completed transfer of the goods to a shipping room or a shipping point, or in case of faulty filling of the transport boxes.

In advantageous embodiments, the unloading handling module has adjusting means. With these adjusting means, the goods receiving elements and/or the moving elements of the unloading handling module can be adapted to the transfer of the goods to the unloading point of the unloading device and to the conveying unit. In one possible embodiment, the adjusting means may comprise pneumatic, mechanical, electromechanical and/or electromagnetic elements, with which the height of the goods receiving elements of the unloading handling module and thus the transfer point can be adjusted. In further embodiments, the adjusting means can also favor a horizontal adjustment of the goods receiving elements and/or moving elements.

Furthermore, in preferred solutions, the invention provides an unloading handling module that has adjusting means with which the unloading of the goods from the unloading device and the transfer of the goods to the conveying unit can be adjusted. In this way, the unloading handling module avoids the need to adjust the unloading device to the often-standardized conveying units (often offered by different manufacturers).

Such an adjusting means can preferably be a height-adjustable or tiltable transfer surface or also a coupling element to which a conveying unit is temporarily friction-locked (e.g. by magnetic force or controllable, temporary latching elements, which in particularly preferred embodiments bring about the frictional connection with spring elements). In this way, a safe transfer of goods is made possible.

In preferred embodiments, an unloading handling module according to the invention has a control unit with communication means and preferably at least one control means for the goods. The control unit is here connected to the goods supply, the unloading device and the conveying unit by means of conveying technology and enables system control and material flow control. For example, a warehouse employee can use the control unit to reject defective goods in the unloading handling module from further conveying. In addition, the communication means of the control unit enable an exchange of information between the goods supply, the unloading device, the unloading handling module and the conveying unit.

This enables optimal system operation and early detection of delay or system downtime risks. In one possible embodiment, the unloading handling module comprises a sensor system, which is arranged between the unloading handling module and the unloading device, which in particular detects the approach of the respective goods and feeds this information to a control unit. By means of the sensor system, the goods supply, the unloading device and/or the unloading handling module can be stopped for a short time or brought to a standby position so that the transfer of the goods to the unloading handling module takes place without any problems. A transfer of the goods is only possible when the next member is ready for conveying, especially with regard to the goods receiving and moving elements.

In a simple embodiment, an unloading handling module control means according to the invention can comprise a camera, whereby a warehouse employee can follow the operations on site at the unloading handling module by means of the camera and, if necessary, control them by means of the control unit. In alternative embodiments, the control means comprise sensors, for example RFID sensors, which can identify goods and trigger an alarm if a good is fed for an incorrect order. In still another embodiment, the control means comprise counters, with which goods can be filled and stored by number directly into the goods receiving elements. In still other alternative embodiments, a control means may be a proximity sensor that can sense the position of a conveying unit and thus enable the transfer of goods from the unloading handling module to the conveying unit. Other suitable embodiments are obvious to the skilled person.

In a preferred embodiment of the present invention, the unloading handling module is configured as a dynamic sorting buffer system. Such a system has means for unloading goods from the unloading point of the unloading device, sorting them, and buffering them until they are 9 KDE/mem conveyed further. This can be realized, for example, in the form of a vertically and/or horizontally circulating buffer carousel. In a simple embodiment, the buffer carousel comprises a moving element in the form of a pusher unit and at least one goods receiving element which, after filling until further conveying by the conveying unit, is pushed to the side and buffered so that the goods intended for a next order can be removed from the unloading device.

This specifically enables the unloading device to safely pass on goods without getting into a blocked state or goods from a first commission being mixed with a subsequent commission in an undesirable manner. The number of buffer locations per unloading handling module is thereby preferably specified as a function of the performance or buffer capacity required at the connected unloading device, whereby not all unloading handling modules need to comprise the same number of buffer locations or a buffer system at all.

It is clear from the description herein that an unloading handling module according to the invention may have different or a plurality of functions within a logistics system. On the one hand, the unloading handling module serves to optimize the commissioning of goods after unloading by an unloading device and before packing/shipping. On the other hand, or in addition, the unloading handling module has a waiting function, whereby empty goods receiving elements and/or goods intended for later orders are provided in goods receiving elements in a waiting state. This enables continuous operation with minimal risk of delay or interruption, as the device allows orders to be processed without interruption.

Subsequent introduction of order requests is also a preferred function of the unloading handling module. In this way, it is possible to rearrange the goods or to add or remove individual goods from an order. Finally, intelligent operation of the unloading handling module is possible, as the unloading handling module can be connected to the remaining components of a logistics system, in particular the goods supply, the unloading device and the conveying units, and information can be exchanged between the respective components. The unloading handling module thus has a direct influence on the structure of order processing but complements or extends it in a relevant way.

From the unloading handling module, the goods are passed on to a downstream conveying unit. The conveying unit then conveys the goods on to a shipping room and/or a shipping point. The conveying unit can also have goods receiving elements, but it is also possible in an alternative design that the goods receiving elements of the unloading handling module are taken over by the conveying unit.

In a particularly suitable embodiment, a conveying unit is loaded with goods directly from one or more conveying systems. In addition to the transfer of goods by the unloading handling module to the conveying unit, goods can thus be transferred directly from the conveying system to the conveying units. Thus, a conveying system, for example, in the form of a horizontal sorting array, hanging, lying, tray, roller, trough or cross belt conveyor, can add goods to a goods receiving element of the conveying unit after the transfer of goods by the unloading handling module. The conveying system is therein not limited to the conveying solutions listed here. It is also conceivable that the plurality of conveying systems are independently designed and can transfer goods to the conveying unit downstream of the unloading handling module. From the above description it is evident that a commission-specific addition of goods is possible at almost any point of a device for commissioning goods according to the invention and that this device can therefore meet the different operating and order requirements.

The conveying unit preferably comprises a mobile support unit and at least one manipulation device, which is arranged on the support unit, for handling the goods and/or transferring the goods to the shipping room and/or shipping point. In the course of handling, the goods can be grouped by the manipulation device (while being conveyed by the conveying unit) in a desired manner, for example, or specific processing steps can be carried out (such as printing or attaching information elements to the relevant consignment or individual goods).

In this way, the transport route can be used for such manipulation or processing steps, which enables an additional increase in the performance of the solution according to the invention, in that the transport time after commissioning can be used for work steps. For the transfer of the goods to the shipping room or directly to the shipping company, the manipulation device in the form of a deflector can preferably have active ejector elements or path conveying means (e.g. driven rollers). Alternatively, in preferred embodiments, passive moving elements are also provided on at least some of the manipulation devices (e.g., a tiltable transfer surface), or passive ball table surfaces from which the goods are taken at the shipping room or shipping company by means that are stationary there (e.g., gripper arms or slider).

In a preferred embodiment, the conveying unit is designed as an autonomous vehicle ("Automated Guided Vehicle (AGV)"). One or more vehicles can operate the various unloading handling modules during operation. In a further preferred embodiment, the autonomous vehicle contains an information processing unit which, depending on information generated by the control unit or by software, controls one or more unloading handling modules and there takes over the goods from these and transports them to a shipping room and/or shipping point.

For example, the software-generated information can be transmitted directly to the information processing unit of the AGVs, where the information processing unit communicates with and intelligently controls the unloading handling module by means of the communication means. A conventional AGV vehicle control system includes various sensors and actuators for navigating the deployment environment and for communicating with other AGVs and the unloading handling module, or the goods supply and the unloading device.

The AGVs can be operated individually or with so-called swarm intelligence, whereby the latter includes a regular exchange of information between the AGVs, which leads to an intelligent order distribution. Different computer structures known to the specialist can be used here.

In addition to conveying the goods to the shipping room and/or shipping point, the conveying unit also serves to buffer the goods. This additional function allows goods to be buffered after being picked up by the conveying unit from the unloading handling module before being forwarded to the shipping room. This is useful in situations where there is a congestion of goods or a machine failure at the shipping room and/or shipping point. In conventional logistics systems, a delay at the shipping room and/or shipping point would spread to the remaining components of the logistics system in a follow-up reaction, since buffer systems are only designed as separate devices and are not, as in the present invention, further enabled by the unloading device, the unloading handling module and the conveying units.

A conveying unit according to the invention can add goods to an existing order in different ways. For example, if it is subsequently determined that an item is missing from a goods receiving element already delivered to the downstream conveying unit by the unloading handling module for an order, the conveying unit can move to a special processing station where the missing item of the order is added.

The special processing unit can be a simple intermediate station, where a person or a machine-controlled device adds or removes the missing goods, or another more complex goods supply station with integrated conveying system. A pickup of missing goods of an order can also take place before the conveying unit arrives at the unloading handling module. The exact handling of the pickup of missing goods can be configured by means of the control unit.

In a further embodiment, the processing unit also has a buffer option or is designed as one or more buffer units. A corresponding buffer unit can in this way be integrated into the processing unit or be assigned to the processing unit as a separate module.

Thus, goods can be additionally buffered by a conveying unit after removal of the goods from the unloading handling module and before transfer of the goods to the shipping room or shipping point. By means of the control, in connection with this additional buffering, it can be advantageously achieved that the conveying units can each be quickly unloaded and are available for the next handling of an unloading point or an unloading handling module.

In an alternative mode of operation, the conveying units can deliver the goods to different buffer points in a controlled manner.

The incorporation of an additional buffer option after the removal of the goods from the unloading handling module by the conveying unit and before the transfer of the goods to the shipping room or shipping point, further contributes to the fact that dynamic and order-oriented commissioning of goods is possible by means of a device according to the invention.

For example, when it is determined that an order which has already been taken over by a conveying unit is not to be dispatched until a later time, goods can be transferred to the buffer unit of the processing unit. In this way, the conveying units can be made available continuously, even if the order requirements change. Likewise, goods jams and outages can be prevented since the conveying capacity of the conveying system as a whole remains practically unchanged or is increased.

In particular, a device according to the invention makes it possible to optimize plant utilization around the clock. There is a need for pre-commissioning of goods in intralogistics facilities in certain operating situations, especially in periods with peak utilization of the facility. In order to meet such high operating requirements and loads, efficient provision is necessary, which is achieved at busy times according to the invention by means of pre-commissioning of goods. Pre-commissioning takes place during the night (or other times with reduced operating personnel), which entails additional automation requirements, since the intralogistics facilities cannot be monitored overnight, or at least not completely by employees. From the above description, it is clear that the present buffer solution overcomes this problem, namely through full automation by means of pre-commissioning and corresponding commission-ready buffering of goods, which is achieved here by means of the conveying units and downstream buffering.

Advantageously, a conveying unit according to the invention has elongated, fixed or movable, rib elements or lines in the holding area for the commissioned goods in order to hold the goods in position during the conveying path.

In a particularly preferred embodiment, such ribs are arranged at least around the support surface of the conveying unit. Further alternative locking or stopping elements are known to the skilled person, so in particular holding pins, rubber coatings of the surfaces of the goods receiving and/or moving elements, edges of the goods receiving and/or moving elements which can be raised and lowered, here generally referred to as holding means, which can be overcome by simple application of force during the transfer of the goods to the shipping room and/or the shipping point.

In special cases, the goods can be taken over from the unloading handling module by a loading employee who transfers the goods directly to the shipping point. In this case, the conveying unit comprises only the warehouse employee.

Another aspect of the present invention relates to a method for commissioning goods. The method comprises providing a goods supply, in particular a conveyor, unloading goods through an unloading point of an unloading device, transferring the goods from the unloading device to an unloading handling module, and transferring the goods from the unloading handling module to a conveying unit by means of at least one moving element of the unloading handling module.

The present method makes it possible to pick and buffer goods after conveying in a conveying system and after unloading at an unloading device by means of the unloading handling module. In conventional processes, goods are transferred directly from an unloading point to a carrying device, whereby a carrying device must be available in each case to pick up goods that are intended for a specific order. There are no buffering possibilities at the unloading point until the goods are picked up by the carrying device, so that delays and congestion often occur.

Unloading of the goods at the unloading point is preferably done by a first feeding unit. A feed chute represents a possible embodiment of a feeding unit according to the invention, whereby the goods reach the unloading device directly from the unloading point or from a conveyor along the feed chute. The transfer of the goods from the unloading device to the unloading handling module preferably takes place via a second feeding unit. The first and second feeding units can be designed identically, but in particular embodiments can also be designed differently. Thus, it is specifically possible to realize the first feeding unit as a feed chute and the second feeding unit as a conveyor or ejector element, or vice versa.

The unloading device, the unloading handling module and the conveying unit are connected to each other in terms of conveying technology. By means of a control unit of the unloading handling module, the process can be controlled and adapted, in a possible embodiment this can also be automated.

As already described above, the moving elements according to the invention can be designed as passive or active moving elements. In a possible passive design, the moving element of the unloading handling module is a support surface which, by tilting the support surface, causes the goods to be processed to slide off the support surface by sheer force of gravity, after the surface has been tilted to an adjustable angle.

The inclination of the support surface advantageously takes place in response to the conveying unit reaching a predetermined transfer point, the transfer point being determinable by means of suitable sensors on the unloading handling module and/or the conveying unit. An alternative active embodiment of the moving elements is a slider, which pushes the goods from the unloading handling module onto the conveying unit, also in response to the conveying unit reaching a predetermined transfer point.

Finally, another aspect of the present invention relates to a system for commissioning goods. The system comprises means for carrying out the steps of the method according to the invention.

In a preferred embodiment, the system comprises a goods input unit with a goods control unit for providing goods, a first conveying device for removing the goods from the goods supply, a second conveying device for transferring the goods to a shipping room and/or (directly) a shipping point, and an interface for the dynamic commissioning of the goods, the interface being arranged between the first and the second conveying device. The goods input unit with the goods control unit, the first and second conveying devices and the interface are connected to one another in terms of conveying technology, the goods receiving unit with the goods control unit preferably being designed as a goods supply according to the invention.

In a preferred embodiment, the first conveying unit of a system according to the invention is an unloading unit according to the invention. Furthermore, in another possible embodiment, the first conveying unit comprises a conveyer installation, in particular a conveyer installation comprising a conveying system, a conveyor belt and a fill unit, by means of which the goods are taken over from the goods supply and conveyed on to the interface in an order-oriented manner.

In a preferred embodiment, the second conveying unit is a conveyor unit according to the invention, in particular an autonomous vehicle (AGV).

Advantageously, the interface for the dynamic commissioning of goods comprises an unloading handling module according to the invention.

In a further advantageous embodiment, a system for commissioning goods according to the invention comprises a goods output unit for defective, damaged or marked goods. Marked goods can be, for example, goods that have been removed from an order at a later point in time or have been rejected from further conveyance for other reasons and are therefore marked physically and/or digitally (preferably with an RFID tag).

Furthermore, in alternative embodiments, a system according to the invention comprises a storage system and an additional buffer unit. The storage system serves here as a long-term storage system and the buffer unit functions in the present sense as a short-term storage system with sorting functions.

For the person skilled in the art, it is self-evident that all described embodiments can be realized in an embodiment of the present invention according to the invention, provided that they are not explicitly mutually exclusive.

In the following, the present invention will now be explained in more detail with reference to specific examples of embodiments and figures, without, however, being limited to these.

By studying these particular embodiments and figures, further advantageous embodiments of the present invention may become apparent to one skilled in the art.

BRIEF DESCRIPTION OF SEVERAL VIEWS OF THE DRAWINGS

For a better understanding of the present invention, reference is made below to the figures. These show individual embodiments of the subject matter of the invention, which are not to be understood as limiting the invention to the specific features disclosed herein.

Identical or analogous reference signs are used in the following figures and the accompanying description for parts which are identical or have the same effect.

DETAILED DESCRIPTION OF THE INVENTION

For the person skilled in the art, various further modifications of the present invention, which also fall within the scope of protection of the claims, are apparent from the description and the associated figures in addition to the examples disclosed here. These may in particular consist in replacing individual components by elements or process steps known to the skilled person and having the same effect. In addition, reference is made in the description to publications, the disclosure content of which is hereby incorporated in its entirety by reference in the description. Likewise, constructive system connections known to the person skilled in the art are to be understood as included in the invention.

Figure 1:
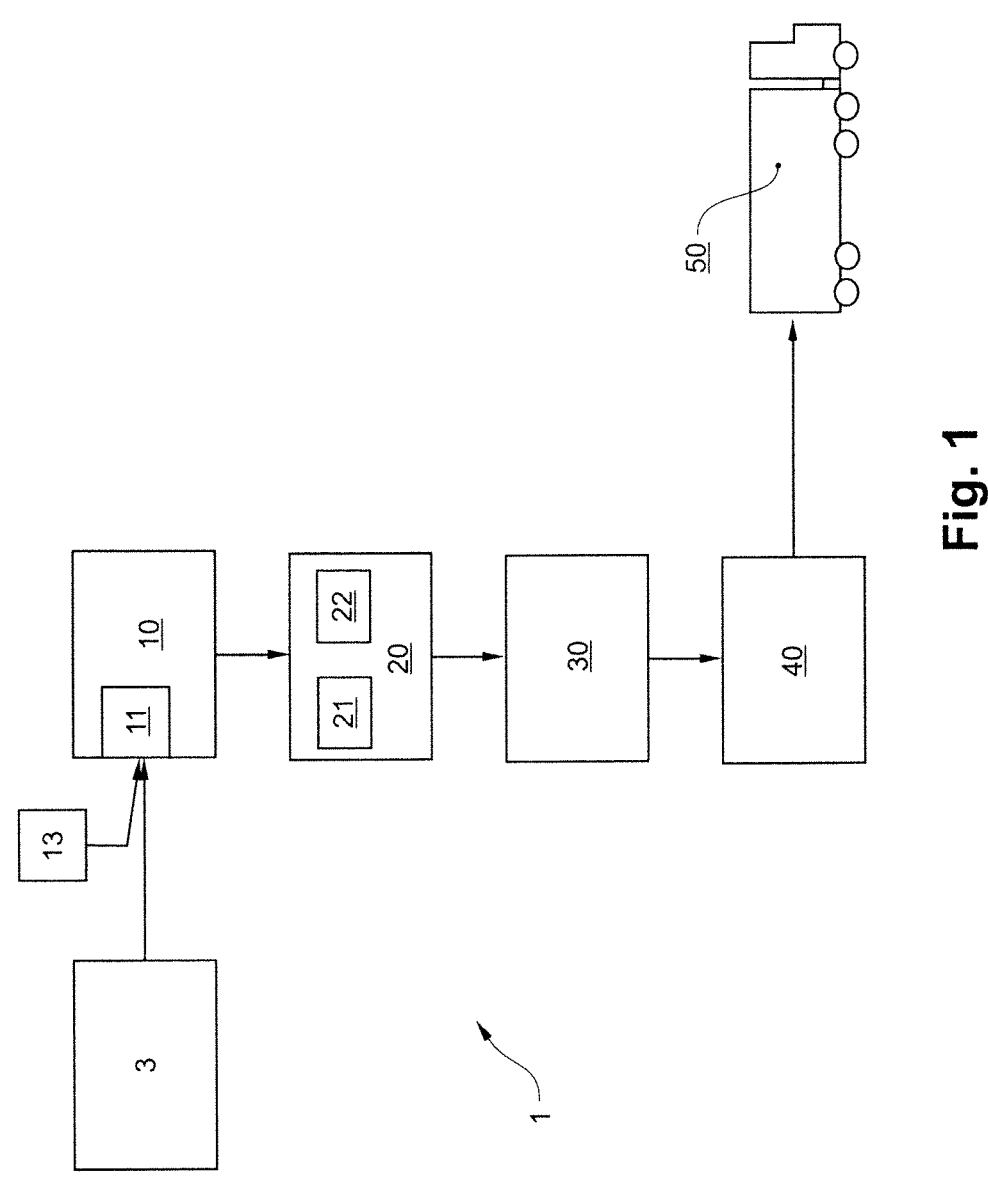
FIG. 1 shows a schematic diagram of a device for the commissioning of goods according to the invention.
Figure 2:
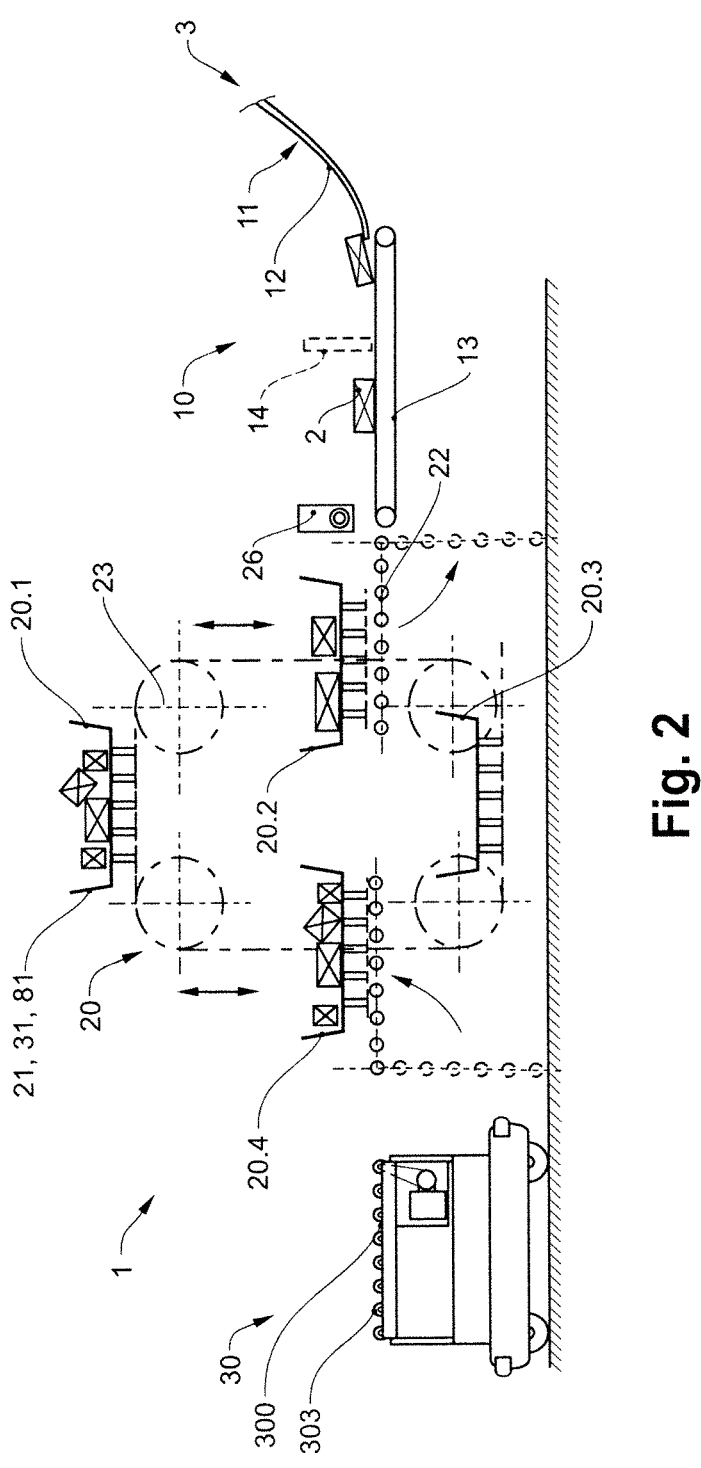
FIG. 2 shows a schematic representation of an unloading device, an unloading handling module and a conveying unit of the device according to the invention.

FIGS. 1 and 2 show a device 1 according to the invention for the commissioning of goods 2, whereby FIG. 1 schematically shows the essential system components described in more detail in the further figures. In the embodiment shown, the device 1 according to the invention comprises an unloading device 10, which has at least one unloading point 11 for unloading or taking over goods. In the example shown in FIG. 2, the commissioned goods 2 (FIG. 2) are fed to the unloading device 10 via a known goods supply 3 mentioned at the beginning or via other conventional goods feeds. In terms of system technology, this can consist of a simple or complex conveying system or, if desired, also have more than one individual feed in the area of the unloading point 11 (e.g., two separate belt conveyors or two different conveying systems for different goods, in the case of separate conveyor paths for such different goods). It is known to the skilled person that such goods supply systems preferably comprise recumbent or overhead conveyors, or alternatively other conveying elements, such as an operating robot for delivering particular individual goods to the unloading point 11. The unloading point 11 advantageously has a feeding unit 12 which ensures that the goods are correctly transferred from the unloading point 11 to the unloading device 10. This can preferably be a sliding ramp, a transition roller conveyor or a guide plate. The goods can be transferred to the unloading device 10 as a collection of goods that has already been picked or can be fed to it sequentially so that a collection of goods is provided on or in the unloading device 10. The collection of goods (or only a partial collection of goods or individual goods) is then transferred from the unloading device 10 to a downstream unloading handling module 20, as will be described in more detail below.

The unloading device 10 may be a belt conveyor, as shown for example in FIG. 2, or it may be an unloading table with optional pushers 14 (or one or more grippers/gripping arms or rotating carriers or similar means known to the skilled person) for the movement and/or the optimized arrangement (e.g. preferably compression) of the goods in the area of the unloading device 10. Furthermore, an unloading device 10 according to the invention in the embodiment shown in FIG. 2 has a sensor 26, in particular a proximity sensor. This proximity sensor 26 can be used to determine whether goods 2 are in a suitable position for transfer to the unloading handling module 20. Advantageously, information is exchanged between the sensor 26 and a central control unit, or the control unit 26 of the unloading handling module 20. After determining that goods 2 are at a suitable transfer point, a signal can be transmitted from the sensor 26 to the control unit and from the control unit to the unloading handling module 20, whereupon a transfer of the goods 2 to the unloading handling module 20 takes place.

The unloading handling module 20, which is significant for the invention, is now connected downstream of the unloading device 10. This is designed to perform various functions suitable for the commissioning of the goods 2 and at the same time to enable an interface function for the further transport of the goods 2 by means of the conveying units 30. These functions can, as shown in the example according to FIG. 4, comprise only a comparatively simple adaptation functionality (there a height adjustability for adaptation to the unloading handling modules 20) up to substantial additional functions, as for example shown in FIG. 2, a buffer solution with circulating goods receptacles 21.1-21.4. Various functions of the unloading handling modules 20 described in connection with the embodiment examples here can be combined with each other in a preferred manner, which is evident to the skilled person.

In the embodiment according to FIG. 2, the goods are transported in goods receiving elements 21, 31, 81 of the unloading handling module 20. The unloading handling module 20 has at least one goods receiving element 21, 31, 81 for receiving the goods 2 and a moving element 22 for transferring the goods 2 to a downstream conveying unit 30. The unloading point 11 of the unloading device 10 can further comprise diverters, which enable an additional sorting of the goods 2 before unloading by the unloading handling module 20.

The unloading handling module 20 is used for order-oriented commissioning, sorting and buffering of the goods 2 after unloading by the unloading point 11 of the unloading device 10 and before onward conveyance of the goods 2 to a shipping room 40 by the onward conveying device 30 and subsequently to a shipping point 50, in particular a shipping vehicle. In an advantageous embodiment, the unloading handling module 20 is equipped with adjusting means 23, wherein the adjusting means 23 enable the unloading handling module 20 to be adjusted (vertically and/or horizontally) to the unloading point 11 of the unloading device 10 and to the conveying unit 30 connected downstream of the unloading handling module 20. In further alternative embodiments, the unloading handling module 20 and/or the conveying unit 30 comprise control means 24, in particular identification means for identifying the goods 2.

After the unloading handling module 20, the goods are transferred to a downstream conveying unit 30, wherein the conveying unit 30 serves to convey the goods to a shipping room 40. The conveying unit 30 can also have goods receiving elements 21, 31, 81 for the goods 2. Advantageously, the conveying unit 30 is implemented as an autonomous vehicle, which enables a dynamic, order-oriented conveying of the goods 2 from and to the unloading handling module 20 or to a shipping room 40.

The shipping room 40 can be a storage area that serves as an intermediate storage or buffer for the transfer to the actual forwarding of the commissioned goods 2 to transport vehicles or shipping companies (shipping company 50 in FIG. 1). The shipping room 40 has packing places or stations for packing the piece goods into shipping boxes and, in particular embodiments, preferably its own sorting unit for sorting and/or grouping the commissioned goods 2 so that they are prepared for the shipping company and assembled for the destination. This ensures that the shipping of the commissioned goods 2 is already efficiently and optimally grouped in the area of the shipping room 40 for different destinations or for loading onto different transport vehicles. The shipping room 40 can consist of a mere buffer section (such as a loading conveyor) or, alternatively and preferably, be designed as a comprehensive storage area which serves for the intermediate storage of quantities of goods for several or a large number of transport vehicle loads or also for the staggered loading of commissioned goods 2.

Figure 3:
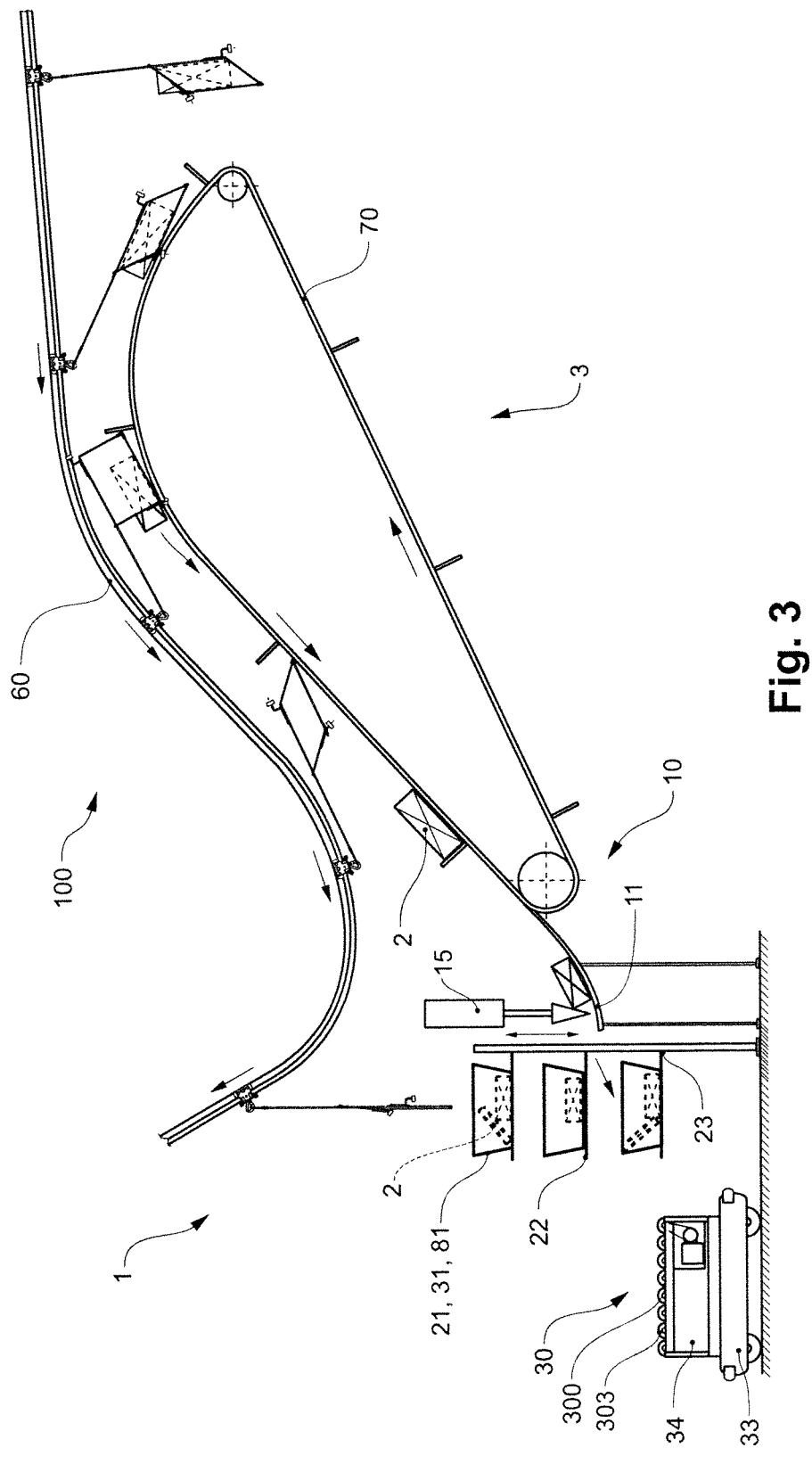
FIG. 3 shows an advantageous embodiment of a device according to the invention and a conveying unit connected to the device.
Figure 4:
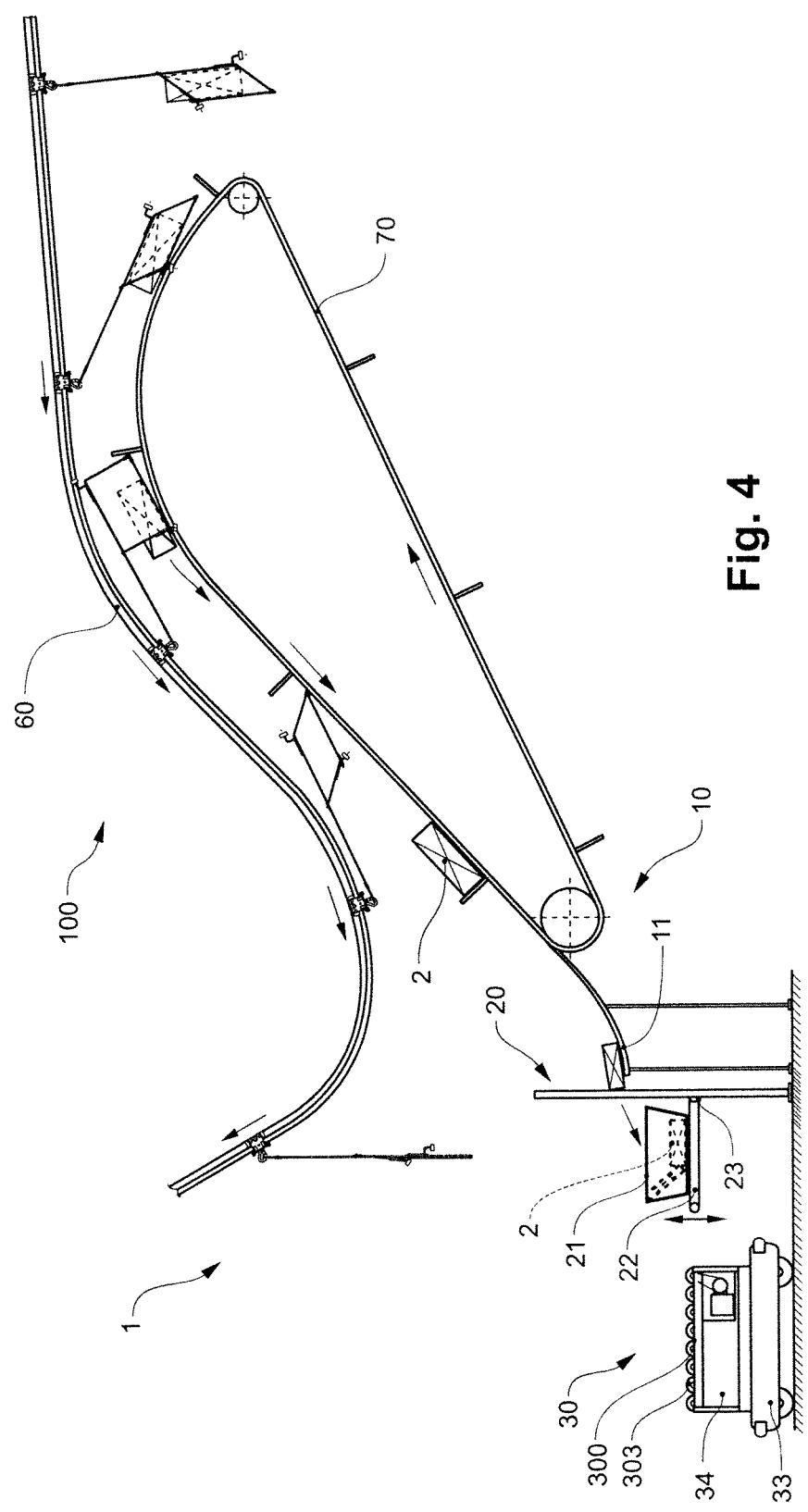
FIG. 4 shows an advantageous embodiment of a device according to the invention with an alternative unloading handling module and a conveying system connected to the device.
Figure 5:
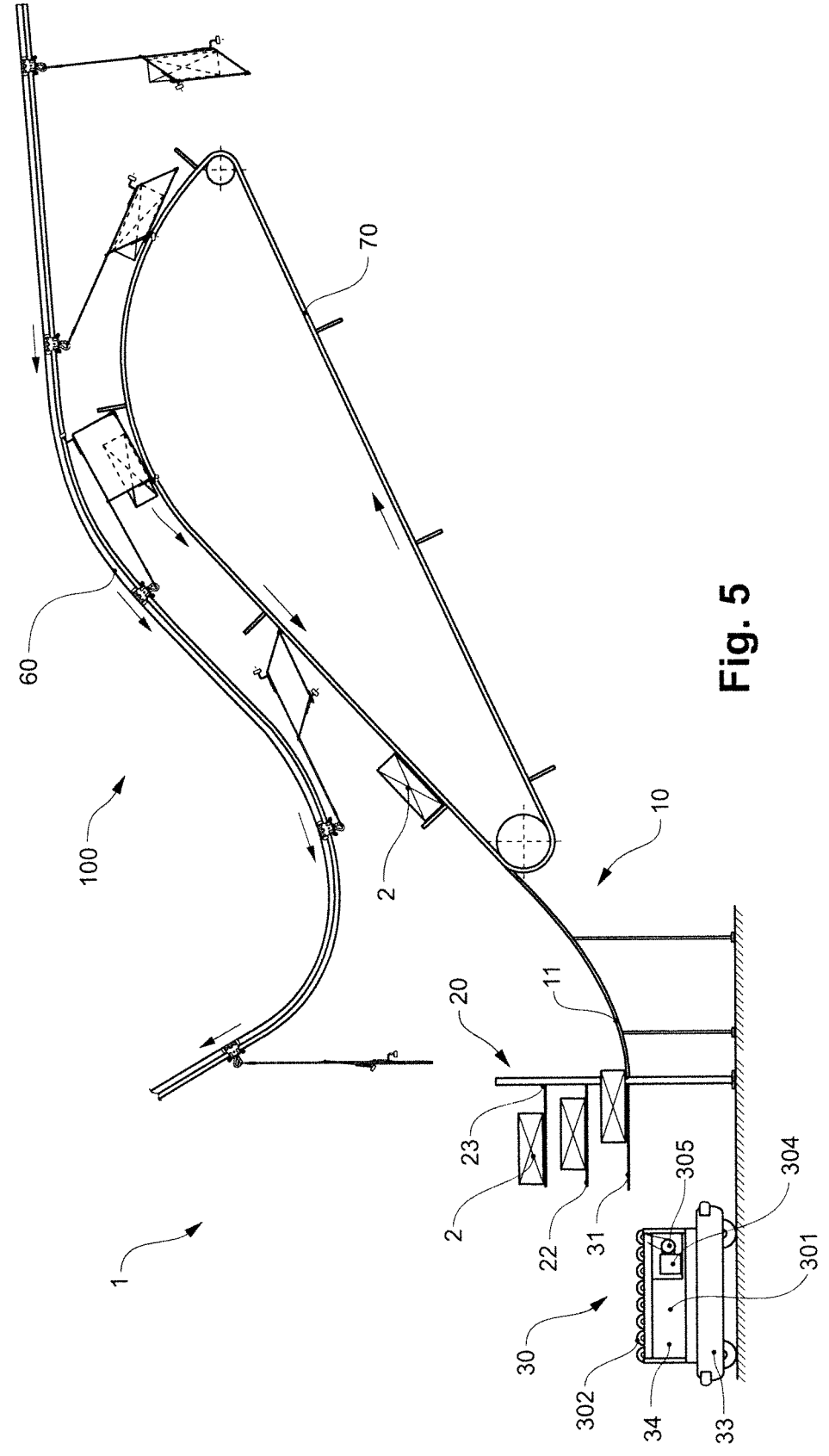
FIG. 5 shows an advantageous embodiment of a device according to the invention with a further alternative unloading handling module and a conveying system connected to the device.

FIGS. 3 to 5 show a device 1 according to the invention, wherein the goods supply 3 comprises a conveying system 60 and a circulating conveyor belt 70, which together form a conveying system. The example of a conveying system shown in FIGS. 3 to 5 is disclosed, for example, in WO 2018/142243 A1 of the applicant.

FIGS. 3 to 5 further show an unloading handling module 20 according to the invention, wherein the height of the goods receiving elements 21, 31, 81 and thus the transfer point can be adapted to the height of the unloading point 11 of the unloading device 10 and to the height of the conveying unit 30 by the adjusting means 23 of the unloading handling module 20. Furthermore, several goods 2 of an order can be taken over in a goods receiving element 21, 31, 81 of the unloading handling module 20 by the unloading device 10 and buffered until conveyed away by the conveying unit 30.

The unloading handling module 20 shown in FIGS. 3 and 5 has several goods receiving elements 21, 31, 81 which are vertically adjustable. The goods 2 can thus be buffered vertically until they are transferred to the conveying unit 30. In an alternative embodiment, the goods 2 are transferred to the conveying unit 30 by means of moving elements 22 in the form of sliders.

FIGS. 3 and 4 show an unloading handling module 20 according to the invention, which has at least one goods receiving element 21, 31 81 and at least one moving element 22, 32, the moving element 22, 32 in the examples shown in FIGS. 3 and 4 being in the form of an adjustable receiving surface. The conveying unit 30 comprises moving elements 22 as well as a support unit 33.

The unloading device in FIG. 3 also has a stopping element 15. This stopping element 15 stops the goods after they have been fed through the unloading point 11, so that the goods do not randomly hit the unloading handling module 20, but can be transferred specifically at a suitable transfer point. In addition, the stopping element 15 prevents the goods from falling off the unloading device. In possible embodiments, the stopping element can be designed as a simple stopper, a pin, a rubber coating on the surface, a lowerable and liftable edge or other stopper solutions known to the skilled person.

FIG. 5 shows an advantageous variant of a device 1 according to the invention, wherein the conveying unit is realized as an autonomous vehicle 30 with integrated roller conveyor 302. The integrated roller conveyor 302 comprises a motor 303 with an impeller 304, which drives a first conveyor roller of the roller conveyor 302 via a V-belt and is arranged in the vehicle housing 301. The remaining conveyor rollers of the roller conveyor 302 are driven by the first driven conveyor roller, for example via a V-belt. When a good 2 sliding over the feeding unit 12 in the form of a feed chute reaches the autonomous vehicle 30, which is located at a transfer point at the end of the feed chute, the driven conveyor rollers move the received good 2 to the center of the support surface provided by the plurality of conveyor rollers. Advantageously, the autonomous vehicle 30 comprises sensor elements for detecting the position of a good 2 on the roller conveyor 302. This data enables integrated control of the autonomous vehicle 30 and/or the roller conveyor 302, as well as control of the actuated conveyor rollers and positioning of the good 2 on the autonomous vehicle 30. The autonomous vehicle 30 with roller conveyor 302 with the goods 2 resting on the conveyor rollers can subsequently travel to a designated shipping room 40, whereby the (motorized) roller conveyor 302 at this shipping room 40 can also be used to unload the goods 2. In the simple embodiment shown in FIG. 5, the goods receiving elements 31 are suitable surfaces on which the goods are placed directly. In the embodiment shown, the moving elements 22 are inclination elements with which the goods receiving elements 31 can be inclined downwards so that the goods slide onto the downstream conveying unit 30 due to gravity.

Figure 6:
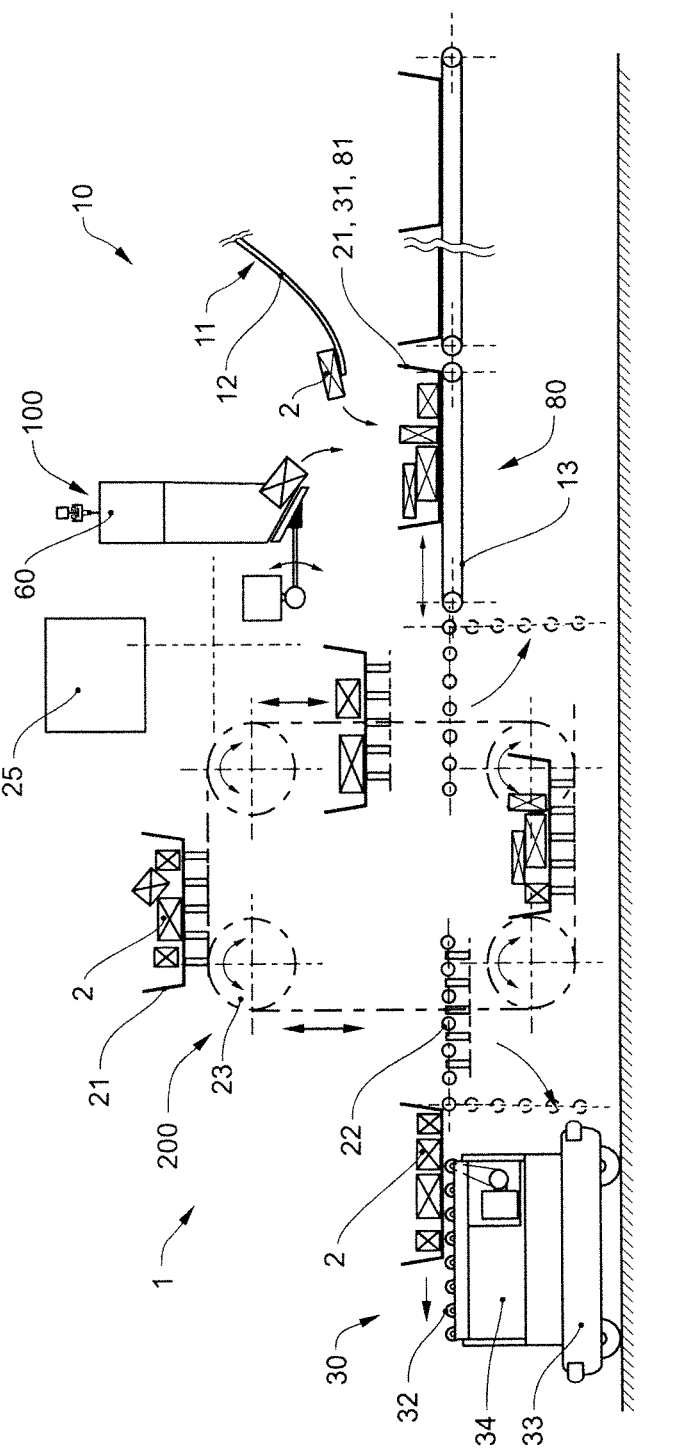
FIG. 6 shows an advantageous embodiment of a device according to the invention with an unloading handling module in the form of a buffer carousel.

FIG. 6 shows an advantageous embodiment of a device according to the invention with an unloading handling module 20 in the form of a buffer system 200, namely a vertical buffer carousel. In the embodiment shown, the goods supply system 3 comprises a conveyor installation 100 with a rail-guided conveying system 60, and the unloading device 10 comprises an unloading point 11 and a fill unit 80. FIG. 6 shows two possible feed variants of goods 2 to the fill unit 80, which collects the goods 2 in an order-oriented manner in goods receiving elements 21, 31, 81 before passing them on to the unloading handling module 20 and sorts them accordingly. A first possible feed variant is a direct unloading of the goods 2 from the conveying system 60 to the fill unit. A second possible variant is the unloading of goods 2 by the fill unit 80 from the unloading point 11 of the unloading device 10. The fill unit 80 is shown here as a horizontal conveyor. The goods receiving elements 21, 31, 81 filled with goods 2 are then transferred to the buffer carousel. The buffer carousel buffers the goods and holds them ready until a conveying unit, advantageously in the form of an AGV, picks up the goods and conveys them further. The buffer carousel in FIG. 6 has adjusting means 23 in the form of deflection rollers. Furthermore, an external control unit of the unloading handling module can be seen.

Figure 7:
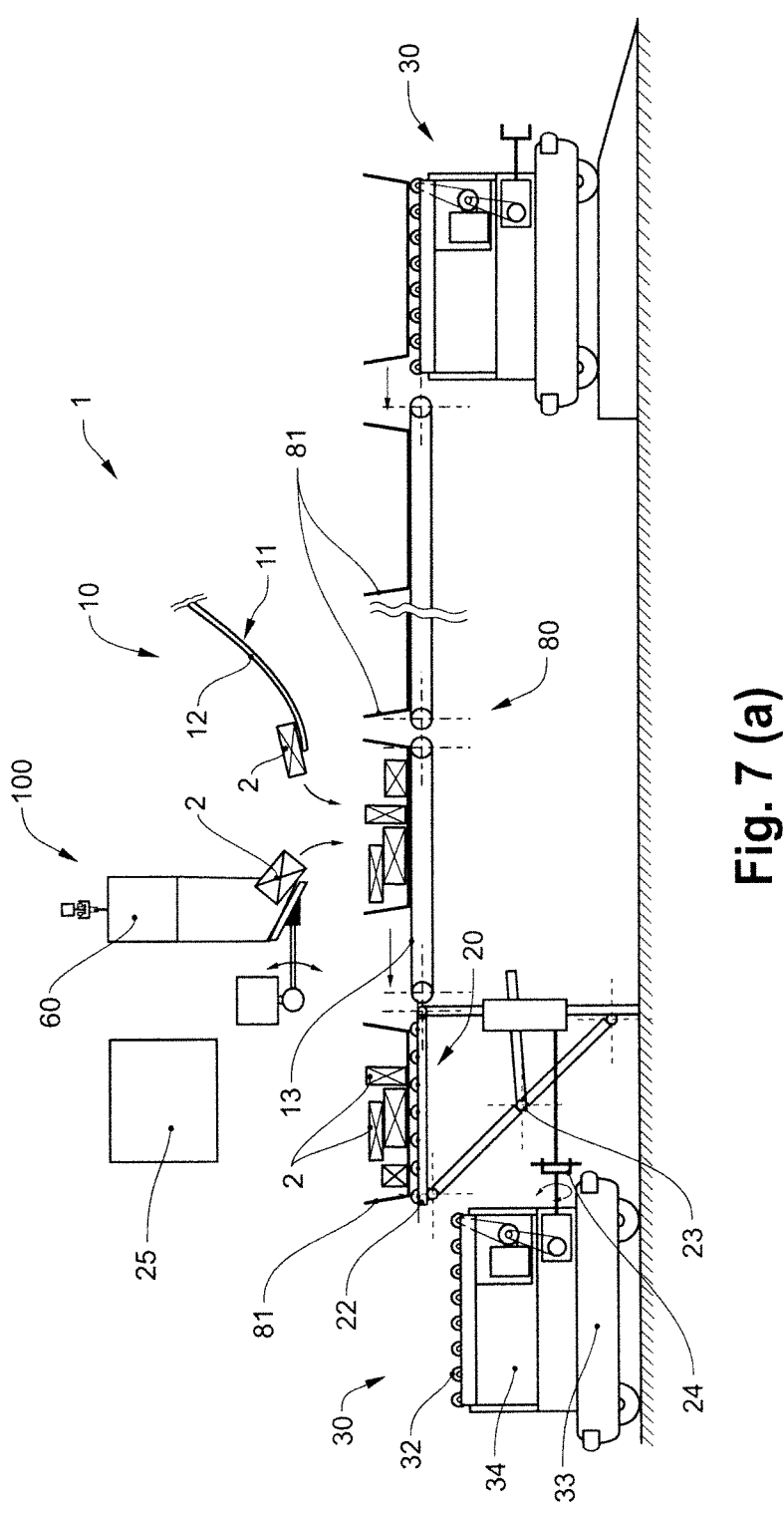
FIG. 7(a) shows an advantageous embodiment of a device according to the invention with a unloading handling module in the form of a tilting table with proximity sensor and/or an actuating device for controlling the tilting table.
FIG. 7(b) shows a further operation of the device shown in FIG. 7(a).
FIG. 7(c) shows a still further operation of the device shown in FIG. 7(a).
Figure 7:
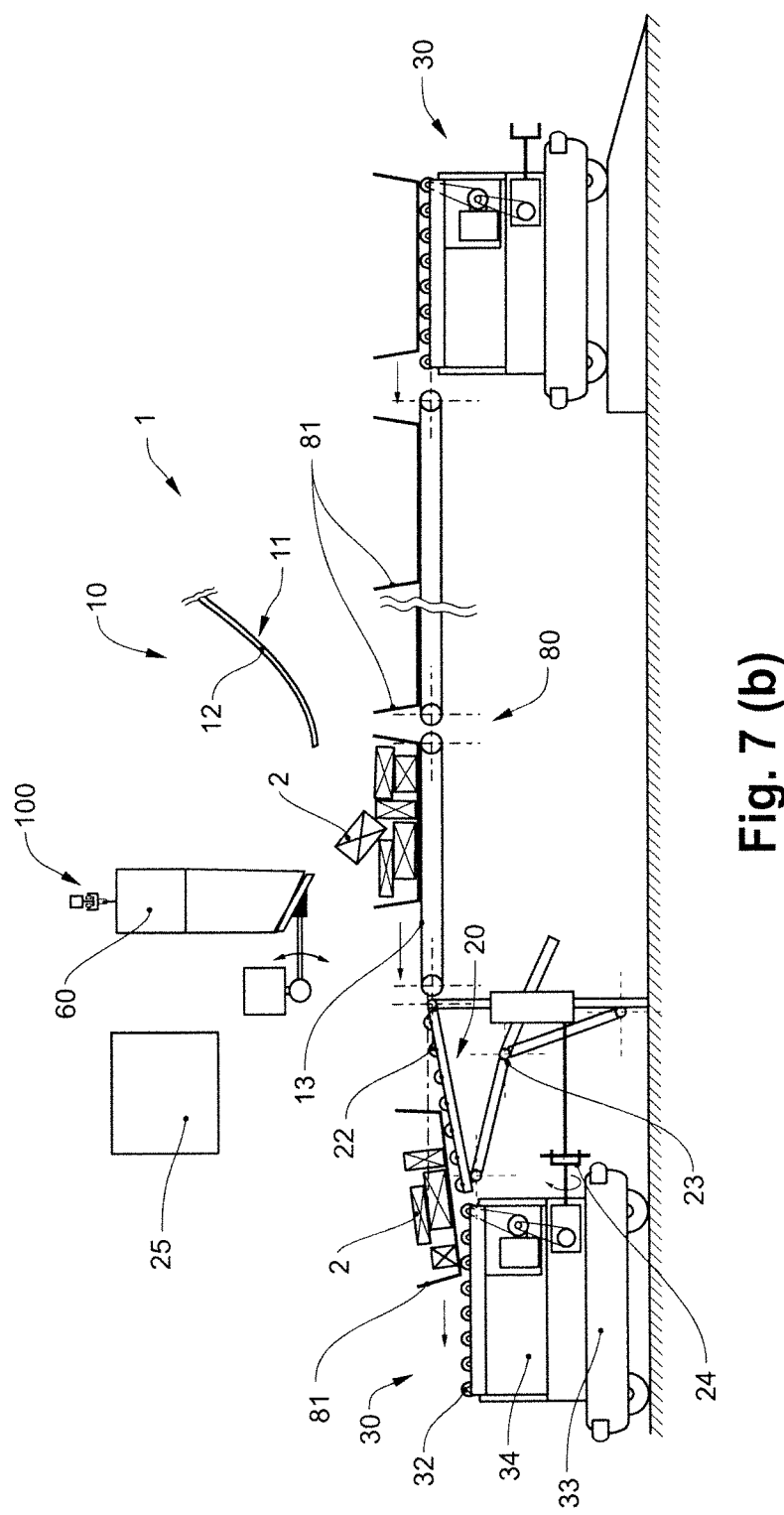
Figure 7:
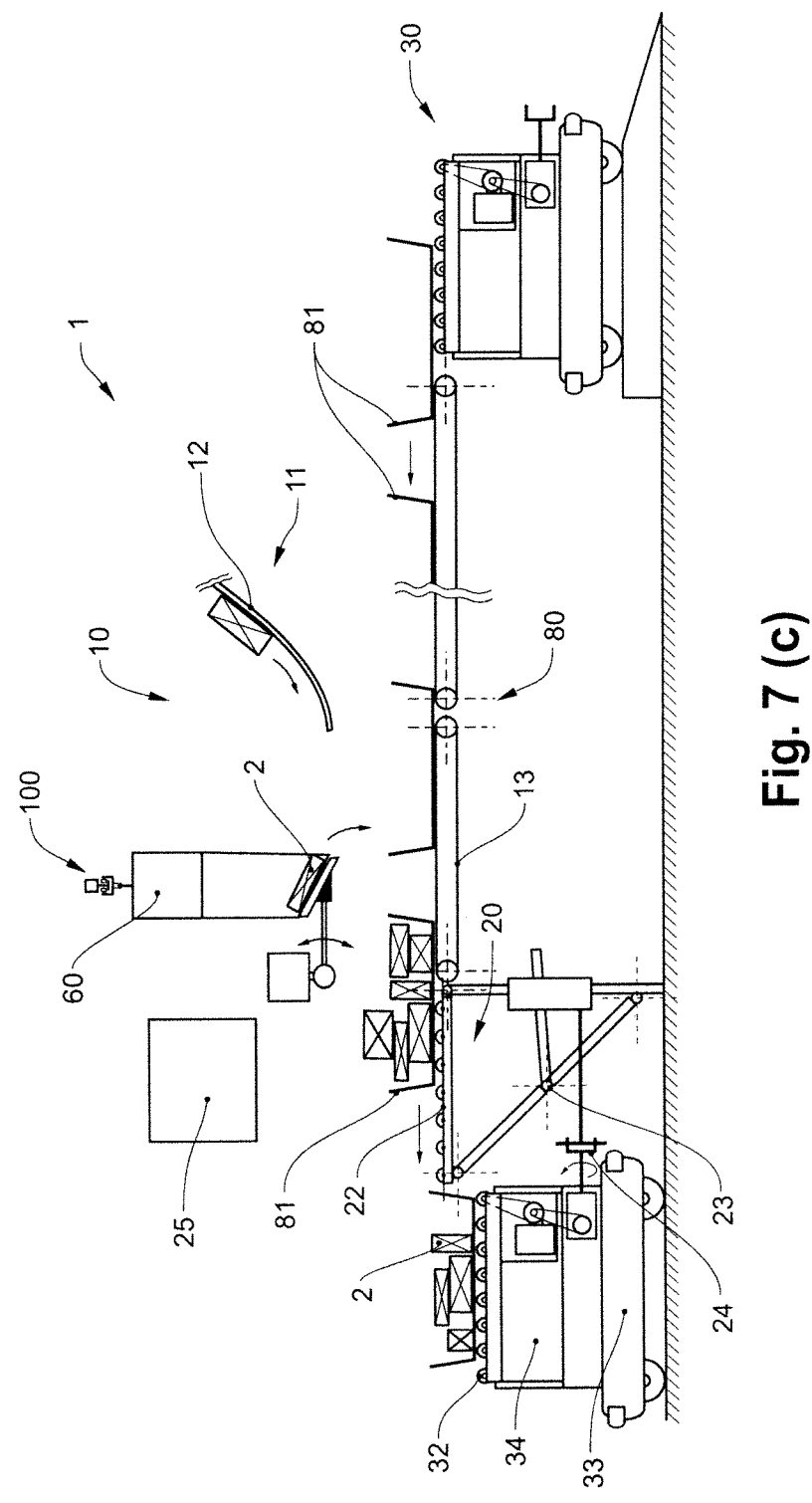

FIGS. 7(*a*) to 7(*c*) show an advantageous embodiment of a device 1 according to the invention with an unloading handling module 20 in the form of a tilting table with control means 24 in the form of a proximity sensor. Shown is a goods conveying sequence according to the invention from unloading by the unloading device 10, comprising an unloading point 11 with feeding unit 12, a conveyor installation 100 with a conveying system 60 and a fill unit 80, to transfer of the goods 2 to the unloading handling module 20, comprising adjusting means 23 and proximity sensor 24 as well as a control unit 25, up to transfer of the goods 2 to a conveying unit 30.

Empty goods receiving elements 21, 31, 81 can, in one possible embodiment, be transported from a conveying unit 30 back to the fill unit 80 after conveying the goods 2 to a shipping room 40 and/or shipping point 50. The fill unit 80 designed as a conveyor conveys the empty goods receiving elements 21, 31, 81 after delivery of the empty goods receiving elements 21, 31, 81 by a conveying unit 30 to the unloading point 11 and/or conveyor installation 100 of the unloading device 10. Here, by means of the already mentioned feed variants, the goods 2 are unloaded into goods receiving elements 21, 31, 81 in an order-oriented manner, whereupon the goods receiving elements 21, 31, 81 filled with goods 2 are conveyed in the direction of the unloading handling module 20.

In preferred solutions for the fill unit 80, the latter has an added or attached buffer for the empty goods receiving elements 81 (buffer unit for the empty goods receiving elements 81). This is shown in FIG. 7(*a*) in a simplified way by the several available goods receiving elements 81. This avoids waiting times at the unloading point 11 when continuous goods acceptance is required there.

The unloading handling module 20 of FIGS. 7(*a*) to 7(*c*) is designed as a tilting table. The tilting table is actuated in FIGS. 7(*a*) to 7(*c*) by means of a control means 24 in the form of a rotary motor. The rotary motor 24 comprises a contact point which, when the conveying unit 30 on the unloading handling module 20 is actuated, contacts a corresponding contact point on the conveying unit and couples with the latter. Thereupon, the rotary motor is released by the control unit 25 of the unloading handling module 20. The rotary motor 24 is operatively connected to the adjusting means 23 so that the tilting table is tilted and the goods 2 slide in the goods receiving element 21, 31, 81 onto the conveying unit 30. After the goods 2 have been transferred to the conveying unit 30, the conveying unit 30 decouples from the rotary motor 24 after prior resetting of the tilting table. In another possible embodiment, a control means 24 in the form of at least one approach sensor can trigger the adjusting means 23 upon arrival of a conveying unit 30, so that the tilting table is tilted in downward direction. The goods receiving element 21, 31, 81 filled with goods 2 then slides along the moving elements 22 of the unloading handling module 20 onto the manipulation device 32 of the conveying unit 30. As soon as the conveying unit 30 leaves the unloading handling module 20, the tilting table is returned to a horizontal position for further unloading of goods 2 from the unloading device 10.

In order to keep the goods positioned during the conveying path on the conveying unit 30 during its path transport (up to the shipping room 40 or to the shipping company 50), the latter preferably has elongated, fixed or movable holding elements in the holding area for the commissioned goods 2 or goods receiving element 21, 31, 81. These can be, in particular, ribbed lines or frames, as shown in a particular embodiment in FIG. 10. The goods 2 or goods receiving elements 81 are thereby held or fixed in their conveying position during the conveying path.

Alternatively or also with the ribbed lines preferably combinable conveying unit 30 in the holding area for the commissioned goods arresting elements are arranged. These are preferably movable holding pins or latching means, rubberized braking elements, which are arranged height-adjustable between rollers and/or other moving elements, which can be overcome or released by force during the transfer of the goods 2 to the shipping room 40 and/or the shipping point 50, and further.

Figure 8A:
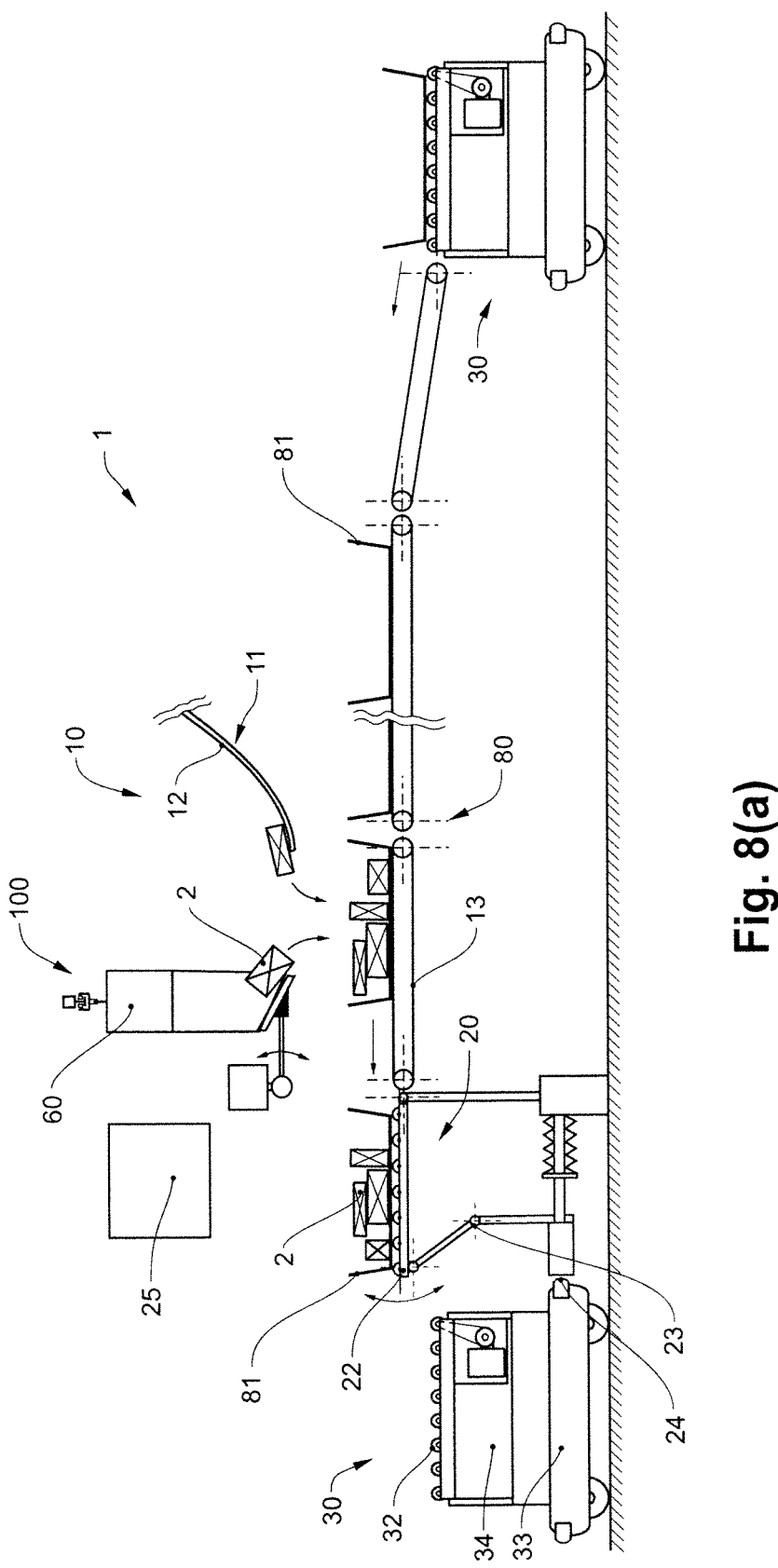
FIG. 8(a) shows an advantageous design of a device according to the invention with an unloading handling module in the form of a tilting table with a return spring which can be activated by the AGV.
Figure 8B:
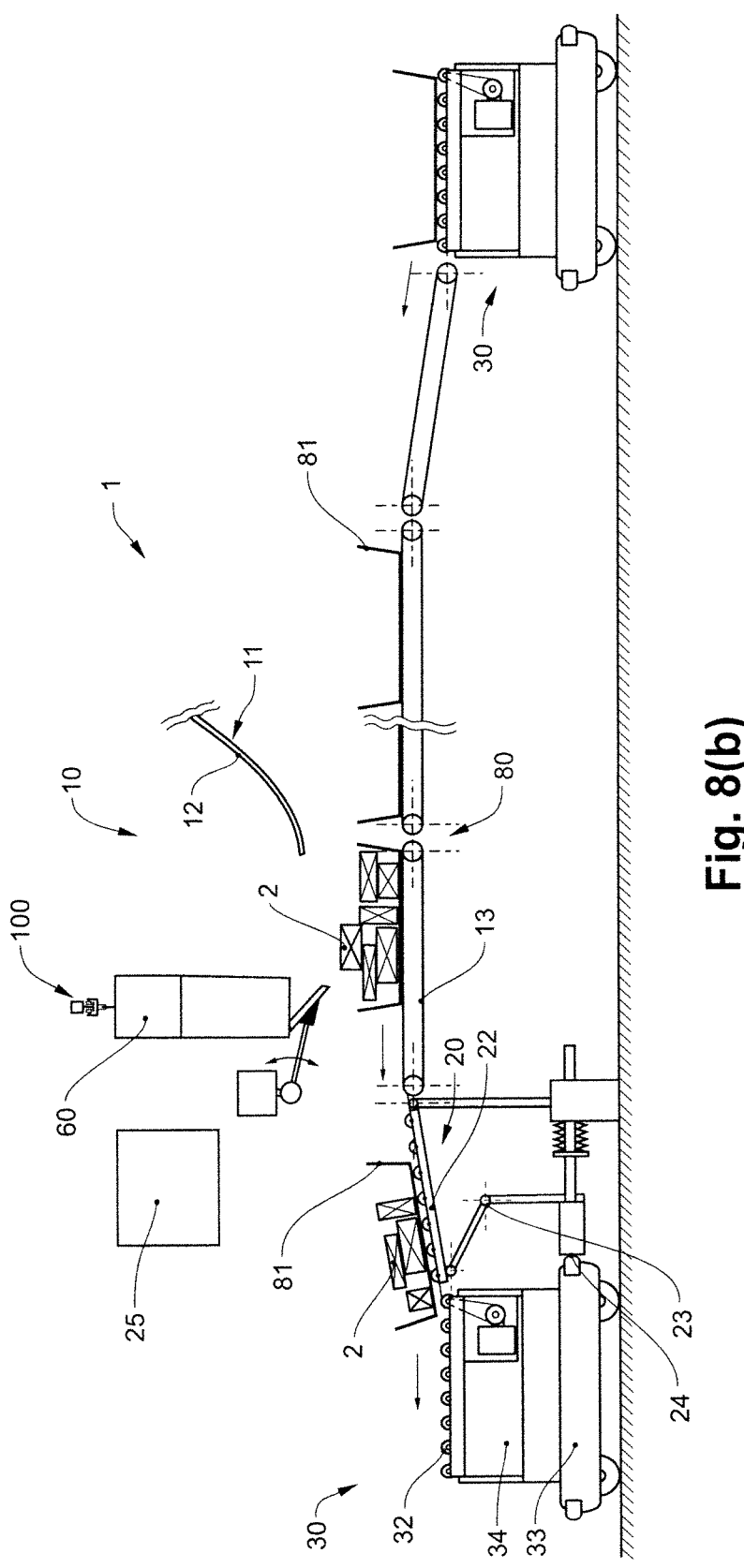
FIG. 8(*b*) shows a further operation of the device shown in FIG. 8(*a*).

FIGS. 8(*a*) and 8(*b*) show an advantageous embodiment of a device 1 according to the invention with an unloading handling module 20 in the form of a tilting table with control means 24 in the form of a spring release. A conveying unit 30 contacts the spring trigger upon arrival at the unloading handling module 20, which is mechanically connected to the adjusting means 23 of the unloading handling module 20. A compress of the spring causes tilting of the tilting table in the downward direction, so that the goods receiving element 21, 31, 81 filled with goods 2 slides along the moving elements 22 of the unloading handling module 20 onto the manipulation device 32 of the conveying unit 30. The spring also serves as a return spring. It moves the table back to the starting position when the AGV moves away from the takeover position.

In FIGS. 8(*a*) and 8(*b*), the fill unit 80 of the unloading device 10 has a ramp which makes it possible to take over goods receiving elements from a lower conveying unit 30. In this way, the unloading device 10 can be adapted to different conveying units 30 and different existing logistics systems.

A goods supply 3 with a conveyor installation 100, comprising a conveying system 60 and a conveyor belt 70, is not shown completely in FIGS. 6 to 8, instead only a part of the goods supply is shown. However, it is apparent to the person skilled in the art that the embodiment shown in FIGS. 8(*a*) and 8(*b*) can also comprise an extended goods supply system 3, in particular with the sorting, storage and conveying systems known to him in the field of logistics.

Figure 9:
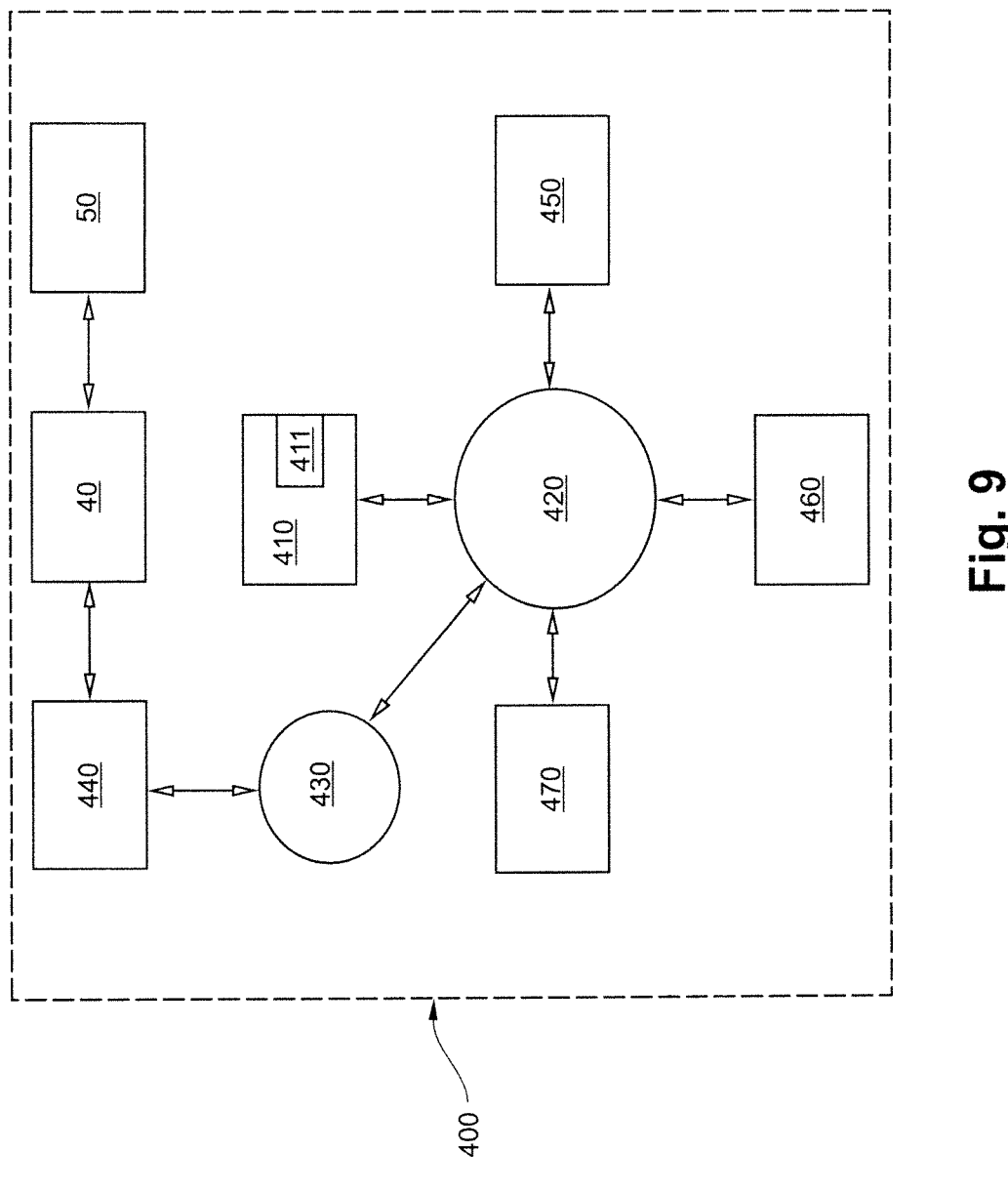
FIG. 9 shows schematically a system according to the invention for the commissioning of goods in connection with various subsystems.

FIG. 9 shows schematically a system 400 according to the invention for the commissioning of goods 2 in connection with various subsystems. Goods are fed into the system via the goods input unit 410 and are taken over by the first conveying unit 420. The goods input unit 410 includes a goods control unit 411, which can be used to control the flow of materials into the first conveying device 420. In further embodiments, it is possible that the goods control unit 411 is formed separately and independently from the goods input unit 410. The first conveying device 420 takes over goods 2 from the goods input unit 410 and conveys the goods 2 further to the interface 430 in an order-oriented manner. The first conveying device 420 is advantageously an overhead conveying system according to WO 2018/142243 A1 of the applicant. In one possible embodiment, such a conveying system comprises a conveying system 60, a circulating conveyor belt 70 and a fill unit 80. The interface 430 receives the goods from the first conveying device 420 and is connected thereto in terms of conveying, the interface 430 being arranged between the first 420 and the second conveying device 440. In a preferred embodiment, the interface 430 is configured as an unloading handling module 20 according to the invention and the second conveying device 440 is configured as a conveying unit 30 according to the invention. In this advantageous embodiment, the goods 2 are transported from the conveying unit 30 to a shipping room 40 and/or a shipping point 50. Advantageously, a system 400 according to the invention for the commissioning of goods 2 further comprises various subsystems, in particular a goods output unit 450, a storage system 460 and a buffer unit 470. The subsystems are also connected to the other components of the system by conveying technology, so that an exchange of information can take place between the system and the subsystems. This can promote optimum dynamic operation of a conveying system according to the invention.

In particular embodiments of the invention, the conveying units 30 can feed individual or multiple goods 2 to the unloading handling modules 20 or transfer such from one unloading handling module 20 to another. In this way, preferentially, fault ejections can be directly remedied by a conveying unit 30, or individual goods 2 that are not conveyable or are difficult to convey by means of the goods supply 3 can be directly fed to a specific unloading handling module. It is apparent to the skilled person that the conveying units 30, if desired, can also already carry along individual goods 2 and thus, when commissioned goods 2 are transferred from an unloading handling module 20 to these conveying units, a final (supplementary) commissioning is achieved according to the invention. Hereby, for example, merchandising articles, packing slips or other goods or information can be added to the commissioned goods and thereby a final commissioning can be achieved.

Furthermore, within the scope of the invention, it is possible for a conveying unit 30 to sequentially or in parallel drive two or more unloading handling modules and in this way combine two groups of commissioned goods. This is particularly advantageous if (e.g., due to the types of goods) the unloading devices 10 or the downstream unloading handling modules 20 are only fed with specific goods 2, but these must be combined with each other for a desired commission. In such particular embodiments that use other conveying units 30 as an alternative to AGVs, e.g., movable conveyor tables, two unloading handling modules 20 can simultaneously or quasi-parallel transfer commissioned goods 2 to them.

According to the invention, the shipping room 40 already described above allows the commissioned goods 2 to be made available to the shipping company in a shipping-optimized manner. If, according to the invention, the conveying units 30 are designed as autonomous vehicles, this makes it possible to fill the shipping room 40, which can also be designed as only a simple buffer store, asynchronously or in a sorting of the commissions which only takes place here, or to provide in the shipping room 40 a suitable sequence or grouping of the commissions directly for the shipping company. This is particularly advantageous if a dedicated sequence is to take place for different transport vehicles or for a desired temporal forwarding of the commissioned goods 2.

Within the scope of the invention, it is also possible to realize the goods unloading elements 21, 31 81 in different embodiments. In one embodiment already described for FIG. 5, the goods receiving elements 21, 31, 81 comprise a suitable supporting surface. In further advantageous embodiments, the goods receiving elements 21, 31 81 are embodied as baskets, open/semi-open containers, boxes or the like. In still further embodiments, the goods receiving elements 21, 31, 81 have two or more sections for sorting the goods on the goods receiving elements 21, 31 81. For example, one section may be provided for large goods and one section may be provided for small goods, or one section may be provided for packaged goods and one section may be provided for non-packaged goods, etc.

In a simple embodiment, the moving elements 22 are inclination elements, as shown for example in FIG. 4 and FIG. 5. However, in further preferred embodiments, they may also be gripper/gripper arms, hooks or carriers. In still further preferred embodiments, the moving elements 22 are support surfaces, conveyors, conveyor belts, pushers/pushers, sliders, pins, robotic units, for example a robotic arm, magnets, compressed air nozzles or other solutions known to those skilled in the art. Similarly, the manipulation device 32 of the conveyor unit 30 can be realized as a conveyor, conveyor belt, slotter/pusher, slider, pin, robot unit, for example a robot arm, magnet, compressed air nozzle or comparable solutions known to the skilled person.

FIGS. 10 to 13 show different variants of a conveying unit 30 according to the invention with manipulation device 32 and various preferably possible holding and locking elements 35-39.

Figures 10, 11, 12, 13:
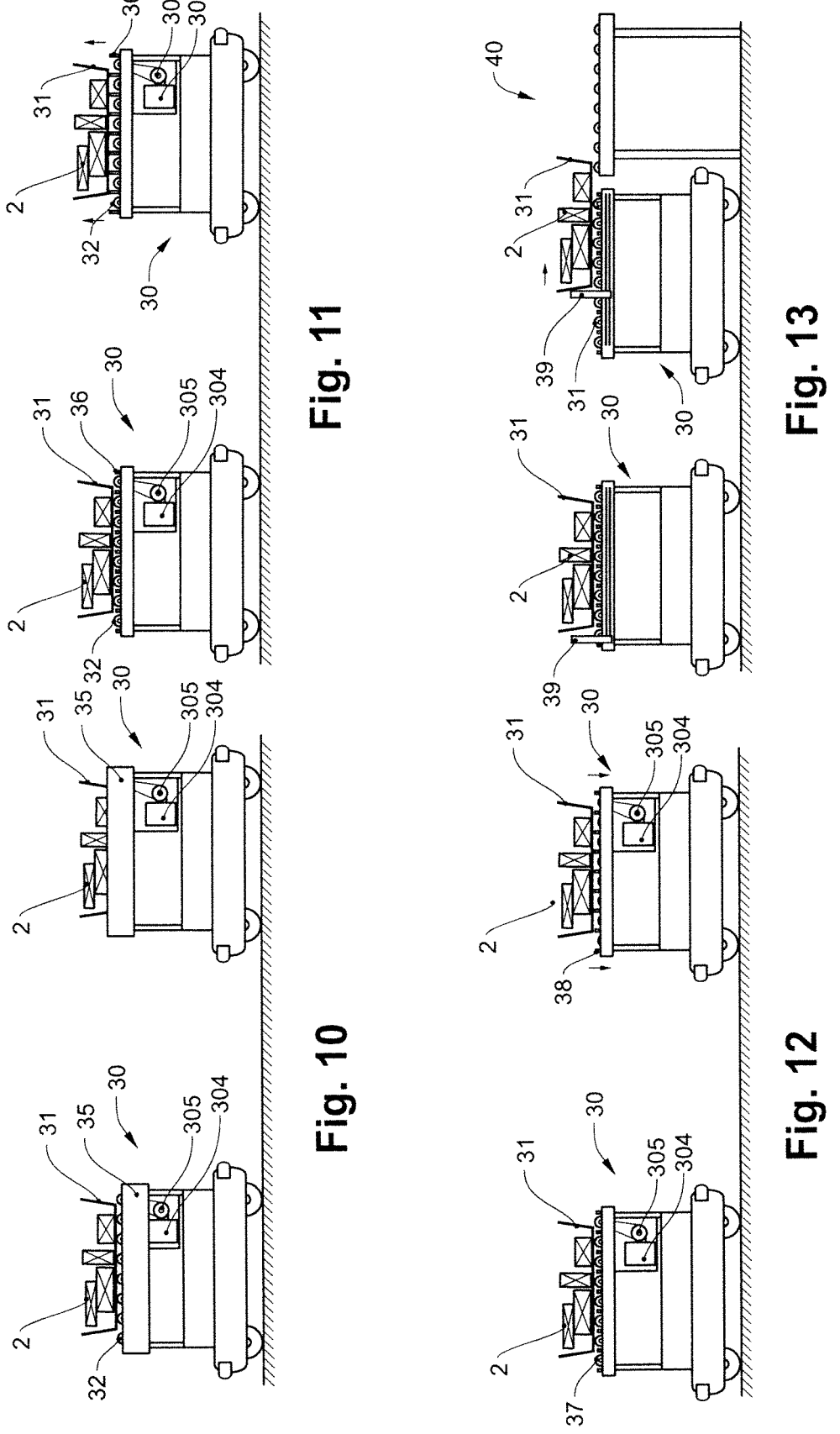
FIG. 10 shows a conveying unit with a height-adjustable frame.
FIG. 11 shows a conveying unit with a lift-off pin matrix.
FIG. 12 shows a conveying unit with lowerable rollers.
FIG. 13 shows a conveying unit with a slider for pushing goods

FIG. 10 schematically shows a conveying unit 30 according to the invention for transferring goods 2 in a goods receiving element 31 to a shipping room 40 and/or a shipping point 50, wherein the conveying unit 30 in the embodiment shown in FIG. 10 has an active manipulation device 32 in the form of a roller conveyor. The roller conveyor 32 is driven by means of a motor 304 having an impeller 305. Furthermore, the conveying unit 30 in FIG. 10 has a locking element in the form of a height-adjustable frame 35. After the goods 2 have been transferred and positioned, the height-adjustable frame 35 can be used to ensure that the goods 2 in or without goods receiving elements 31 (or individual goods) do not change their position during transport on the conveying unit 30 or even fall off the conveying unit 30. The frame is also motorized movable and in an alternative embodiment controllable by means of the control unit 25 of the unloading handling module 20. In another alternative embodiment, instead of the height-adjustable frame 35, the conveying unit 30 may have a circumferential rib structure which holds the goods receiving element 31 or the goods 2 in place during transport on the conveying unit 30. When the conveying unit 30 arrives at a destination, an acting force, for example a slider, a gripper arm or compressed air, can be used to overcome the resistance to movement of the goods 2 on the ribbed structure. In addition, for special, extended embodiments, it is preferably possible to provide, in conjunction with or instead of an edge-running frame or edge-running rib structure, a rib structure with at least two intersecting, elongated ribs, which engages under the bearing surface of the goods receiving element 31 and engages releasably (also by the action of force) in form-fitting groove recesses of the goods receiving element 31, so that, prior to the delivery of the goods, a corresponding fixing of the goods receiving element is provided during the movement of the vehicle. Such a preferred cross-structure of ribs in connection with corresponding recesses on the goods receiving element 31 enables a particularly simple fixation or holding during transport. It is obvious to the skilled person that a constructive reversal, i.e. recesses on the supporting surface of the conveying unit, is also possible. Alternatively, or in combination with rib structures, knobs or truncated cone-shaped projections can also preferably be arranged on the cooperating surfaces.

FIG. 11 shows a conveying unit 30 according to the invention for transferring goods 2 in a goods receiving element 31 to a shipping room 40 and/or a shipping point 50, wherein the conveying unit 30 in the embodiment shown in FIG. 11 has a manipulation device 32 in the faun of a roller conveyor. The roller conveyor 32 is driven by means of a motor 304 having an impeller 305. Furthermore, the conveying unit 30 in FIG. 11 has a liftable and lowerable pen matrix 36 on which the goods 2 are placed in the goods receiving element 31. The liftable and lowerable pen matrix 36 is also motorized movable and is in a lifted position during the transport of the goods 2 on the conveying unit 30. As a result, the goods 2 in the goods receiving element 31 lie directly on the pen matrix 36 and are no longer resting on the conveyor rollers of the roller conveyor 32. Only when the conveying unit 30 arrives at a destination location is the pen matrix 36 lowered so that the goods 2 in the goods receiving element 31 can be passed on by means of the roller conveyor 32. In further alternative embodiments, instead of the pen matrix 36, a liftable and lowerable grate, rods or also rubberized non-slip supports, a grid or other suitable solution can be provided as a locking element.

FIG. 12 shows a conveying unit 30 according to the invention for transferring goods 2 in a goods receiving element 31 to a shipping room 40 and/or a shipping point 50, wherein the conveying unit 30 in the embodiment shown in FIG. 11 has a manipulation device 32 in the form of a roller conveyor. The roller conveyor 32 is driven by means of a motor 304 having an impeller 305. Furthermore, the conveying unit 30 in FIG. 12 has liftable and lowerable rollers 37, in particular liftable and lowerable conveyor rollers of the roller conveyor 32. Between the individual rollers 37 of the roller conveyor 32, rib elements 38 are arranged so that when the rollers 37 are lowered, the goods 2 on the goods receiving element 31 rest directly on the rib elements 38 and are thereby held in their position (analogous to the description with respect to FIG. 10). When the conveying unit 30 arrives at a destination, the rollers 37 are raised again, which allows the goods 2 or the goods receiving element 31 to be passed on.

FIG. 13 shows a conveying unit 30 according to the invention for transferring goods 2 in a goods receiving element 31 to a shipping room 40 and/or a shipping point 50, wherein the conveying unit 30 in the embodiment shown in FIG. 13 has a manipulation device 32 in the form of a roller conveyor. The roller conveyor 32 is driven by means of a motor 304 having an impeller 305. Furthermore, a slider 39 of the conveying unit 30 can be seen in FIG. 13, which is used for transferring goods to a destination, for example the shipping room 40. The slider 39 pushes the goods 2 or the goods receiving element 31 from the conveying unit 30 to the unloading point of the shipping room 40. Here, it is provided that the slider pushes the goods 2 from the conveying unit 30 with sufficient force to overcome the resistance to movement of the goods 2 or the goods receiving element 31. This embodiment is particularly advantageous when the conveying unit 30 includes passive manipulation devices 32, such as non-motorized rollers. In alternative embodiments, the slider 39 may also be a hook, follower, magnet, latching element, robotic arm, or other suitable friction-actuated means known to those skilled in the art. It is also possible to integrate a gripper device or another unloading device into the unloading point of the shipping room, in which case the goods 2 and/or the goods receiving elements 21, 31, 81 are moved away from the conveying unit 30 by means of the grippers or the unloading device.

What is claimed is:

1. A device for commissioning goods, with a goods supply, comprising:
   a) an unloading device with at least one unloading point for unloading goods, and
   b) an unloading handling module to which the goods are transferred from the unloading device, the unloading handling module comprising at least one goods receiving element and at least one moving element for transferring the goods to a downstream conveying unit;
   wherein the unloading handling module is formed as a vertically and horizontally circulating dynamic sorter buffer system configured to sort and buffer the goods after unloading the goods from the unloading device and prior to conveying them further.

2. The device according to claim 1, wherein the unloading point includes a feeding unit for delivering the goods from the goods supply to the unloading device.

3. The device according to claim 1, wherein the unloading device comprises a feeding unit for transferring the goods to the unloading handling module.

4. The device according to claim 1, wherein the goods supply comprises a conveyor installation, in particular a conveyor system and a conveyor belt, which is connected by means of conveying technology to the unloading device that is connected by means of conveying technology to the unloading handling module, wherein the unloading device comprises at least one fill unit.

5. The device according to claim 4, wherein the fill unit has at least one goods receiving element and is formed as a transport conveyor.

6. The device according to claim 4, wherein a buffer unit is integrated into the fill unit or is allocated to it as a separate module.

7. The device according to claim 1, wherein the at least one moving element is formed as a passive moving element.

8. The device according to claim 1, wherein the at least one moving element is formed as an active moving element.

9. The device according to claim 1, wherein the unloading handling module includes adjusting means with which the unloading of the goods from the unloading device and the transfer of the goods to the conveying unit are adjustable.

10. The device according to claim 1, wherein the unloading handling module comprises a control unit with communication means and at least one control means for the goods.

11. The device according to claim 10, wherein the conveying unit comprises one or more autonomous vehicles; and
   wherein at least one autonomous vehicle contains an information processing unit which, depending on information generated by the control unit, controls one or more unloading handling modules and there takes over the goods from these and transports them to a shipping room and/or a shipping point.

12. The device according to claim 1, wherein the unloading handling module is formed as a buffer system comprising a buffer carousel.

13. The device according to claim 1, wherein the conveying unit comprises a mobile support unit and at least one manipulation device for transferring the goods to a shipping room and/or a shipping point.

14. The device according to claim 13, wherein at least one manipulation device is formed as a passive moving element.

15. The device according to claim 13, wherein at least one manipulation device is formed as an active moving element.

16. The device according to claim 1, wherein the conveying unit comprises one or more autonomous vehicles.

17. The device according to claim 16, wherein at least one autonomous vehicle contains an information processing unit which, depending on information generated by software, controls one or more unloading handling modules and there takes over the goods from these and transports them to a shipping room.

18. The device according to claim 1, wherein the conveying unit comprises, in a holding area for the commissioned goods, elongated, fixed, or movable holding elements, or ribbed lines, in order to hold the goods in position throughout the conveying path.

19. A system for commissioning goods comprising:
   a goods input unit with a goods control unit for providing the goods;
   a first conveying device for removing the goods from the goods supply unit;
   a second conveying device for transferring the goods to a shipping room and/or a shipping point; and
   at least one interface for dynamic commissioning of the goods arranged between the first and second conveying device;
   a device for commissioning goods according to claim 1;
   wherein the goods input unit with the goods control unit, the first conveying device, the second conveying device, and the at least one interface are connected by means of conveying technology;
   wherein the goods input unit with the goods control unit is formed as the goods supply of the device for commissioning goods;

wherein the first conveying device is formed as the unloading device of the device for commissioning goods;

wherein the second conveying device is formed as the conveying unit of the device for commissioning goods; and wherein the interface is formed as the unloading handling module of the device for commissioning goods.

20. The system according to claim 19, wherein the first conveying device comprises a conveyor installation having a conveying system, a conveyor belt and a fill unit.

21. The system according to claim 20, wherein the system comprises a goods output unit for the return transport of faulty, damaged and/or marked goods.

22. The system according to claim 19, wherein the system comprises at least one storage system and/or an additional buffer unit.

23. A method for commissioning goods comprising the steps of:

providing a goods supply with a sorting and conveying installation;

unloading goods through an unloading point of an unloading device;

transferring the goods from the unloading device to an unloading handling module, wherein the unloading handling module comprises at least one goods receiving element, and at least one moving element for transferring the goods to a downstream conveying unit, and wherein the unloading handling module is formed as a vertically and horizontally circulating dynamic sorter buffer system configured to sort and buffer the goods after unloading the goods from the unloading device and prior to conveying them further; and passing the goods from the unloading handling module to a downstream conveying unit by at least one moving element of the unloading handling module.

24. The method according to claim 23, wherein the unloading of the goods by the unloading point is carried out by a feeding unit.

25. The method according to claim 23, wherein the transferring of the goods to the unloading handling module is carried out by a feeding unit.

26. The method according to claim 23, wherein the unloading device, the unloading handling module and at least one conveying unit of the goods supply are connected by conveying technology, and that the method can be controlled by a control unit of the unloading handling module.

27. The method according to claim 23, wherein the goods are passed on to a downstream conveying unit by passive moving elements, due to gravity, or active moving elements.

* * * * *